(12) United States Patent
Gaudreau, Jr.

(10) Patent No.: US 8,573,693 B2
(45) Date of Patent: Nov. 5, 2013

(54) ADJUSTABLE HEADREST FOR JUVENILE VEHICLE

(75) Inventor: Paul D. Gaudreau, Jr., Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 99 days.

(21) Appl. No.: 12/975,089

(22) Filed: Dec. 21, 2010

(65) Prior Publication Data
US 2012/0153690 A1 Jun. 21, 2012

(51) Int. Cl.
B60N 2/26 (2006.01)

(52) U.S. Cl.
USPC ..................................................... 297/250.1

(58) Field of Classification Search
USPC ..................................................... 297/250.1
See application file for complete search history.

(56) References Cited

U.S. PATENT DOCUMENTS

| | | | |
|---|---|---|---|
| 3,992,056 A | 11/1976 | Koziatek et al. | |
| 4,033,622 A | 7/1977 | Boudreau | |
| 4,183,580 A | 1/1980 | Johansson | |
| 4,613,188 A | 9/1986 | Tsuge et al. | |
| 4,632,456 A | 12/1986 | Kassai | |
| 5,082,325 A | 1/1992 | Sedlack | |
| 5,366,271 A | 11/1994 | Johnston et al. | |
| 5,468,046 A | 11/1995 | Weber et al. | |
| 6,338,529 B1 | 1/2002 | David et al. | |
| 6,398,302 B1 | 6/2002 | Freedman et al. | |
| 6,491,348 B1 * | 12/2002 | Kain | 297/484 |
| 6,695,412 B2 * | 2/2004 | Barger et al. | 297/484 |
| 6,764,135 B2 | 7/2004 | Sasaki et al. | |
| 6,808,232 B2 | 10/2004 | Takizawa | |
| 6,817,673 B2 | 11/2004 | Walker et al. | |
| 7,246,852 B2 * | 7/2007 | Balensiefer | 297/250.1 |
| 7,246,854 B2 | 7/2007 | Dingman et al. | |
| 7,344,192 B2 | 3/2008 | Kespohl | |
| 7,380,878 B2 | 6/2008 | Clement et al. | |
| 7,467,824 B2 | 12/2008 | Nakhla et al. | |
| 7,472,952 B2 | 1/2009 | Nakhla et al. | |
| 7,475,941 B2 | 1/2009 | Clement et al. | |
| 7,637,568 B2 * | 12/2009 | Meeker et al. | 297/250.1 |
| 2005/0110315 A1 | 5/2005 | Littlehorn et al. | |
| 2006/0006712 A1 | 1/2006 | Clement et al. | |
| 2006/0261650 A1 * | 11/2006 | Billman et al. | 297/250.1 |
| 2009/0200842 A1 | 8/2009 | Goldberg et al. | |
| 2011/0285187 A1 * | 11/2011 | Horton et al. | 297/250.1 |
| 2012/0007397 A1 * | 1/2012 | Fritz et al. | 297/250.1 |
| 2012/0098304 A1 * | 4/2012 | Gaudreau, Jr. | 297/216.11 |
| 2012/0098309 A1 * | 4/2012 | Gaudreau et al. | 297/256.11 |
| 2012/0146369 A1 * | 6/2012 | Gaudreau, Jr. | 297/216.11 |
| 2012/0175921 A1 * | 7/2012 | Gaudreau, Jr. | 297/183.1 |

* cited by examiner

*Primary Examiner* — David Dunn
*Assistant Examiner* — Timothy J Brindley
(74) *Attorney, Agent, or Firm* — Barnes & Thornburg LLP

(57) ABSTRACT

A child restraint includes a juvenile seat and a child-restraint harness coupled to the juvenile seat. The child restraint also includes a headrest mounted for up-and-down movement relative to a seat back included in the juvenile seat.

34 Claims, 12 Drawing Sheets

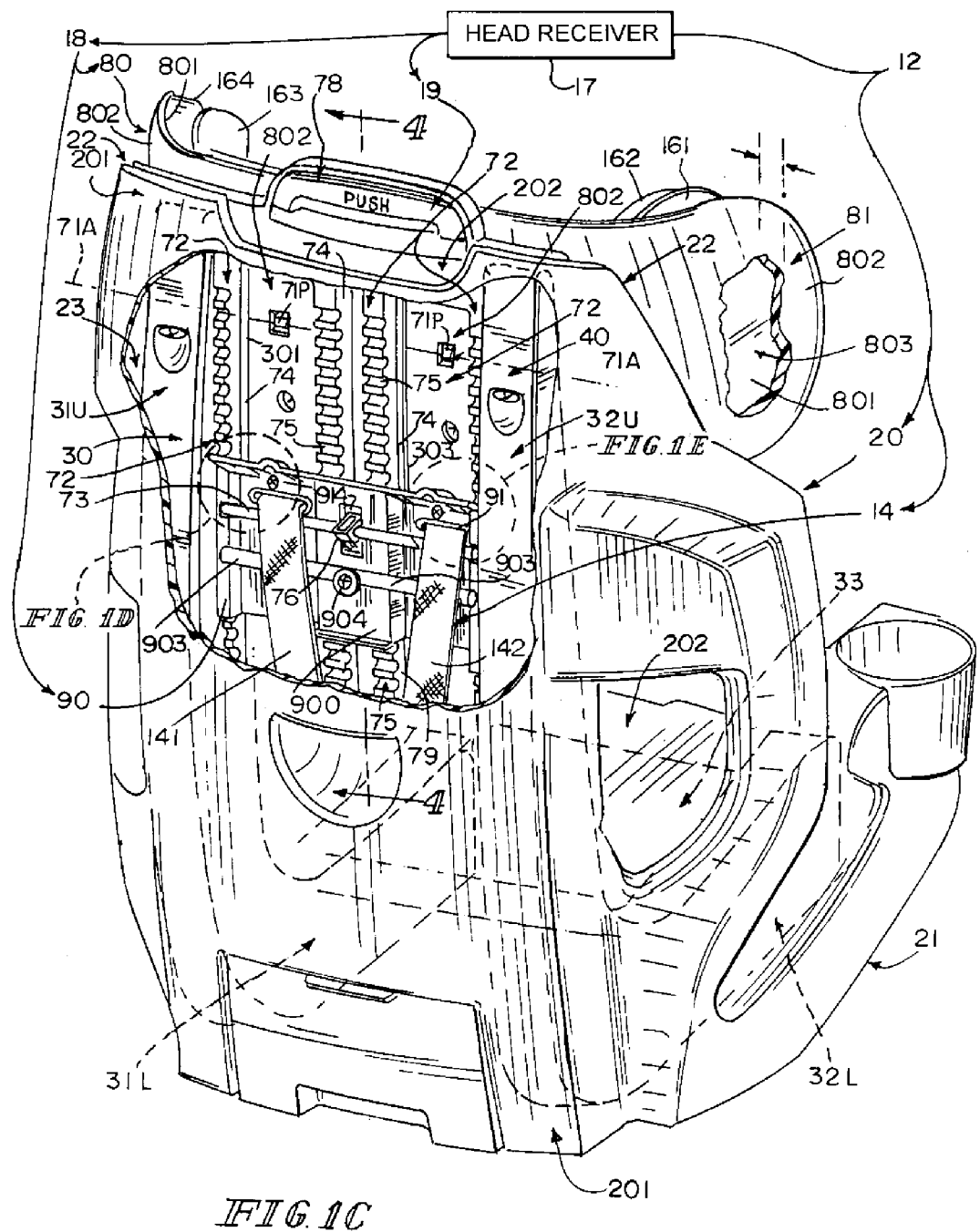

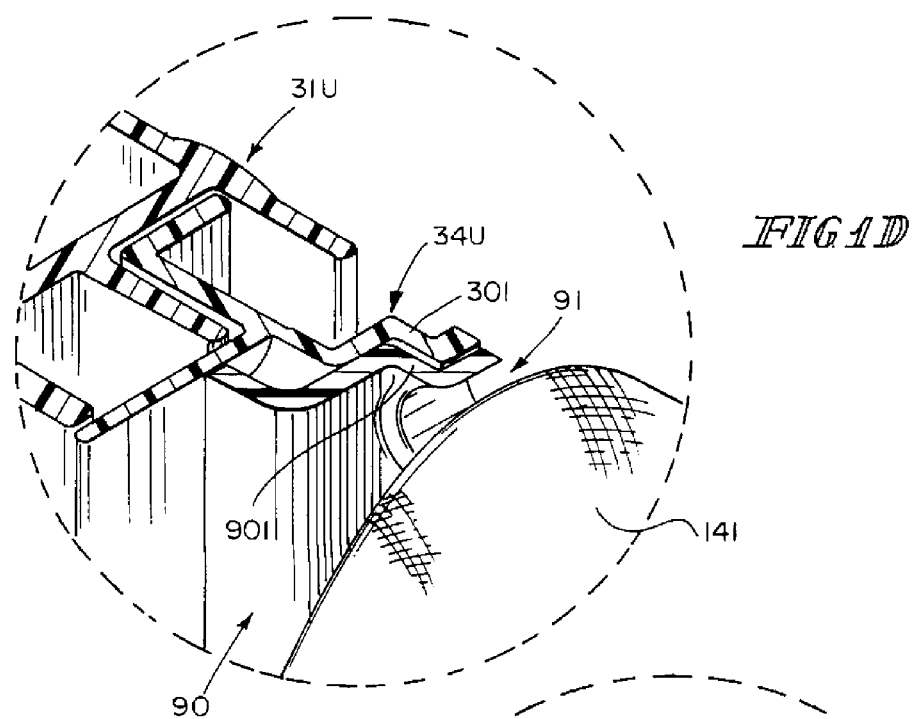
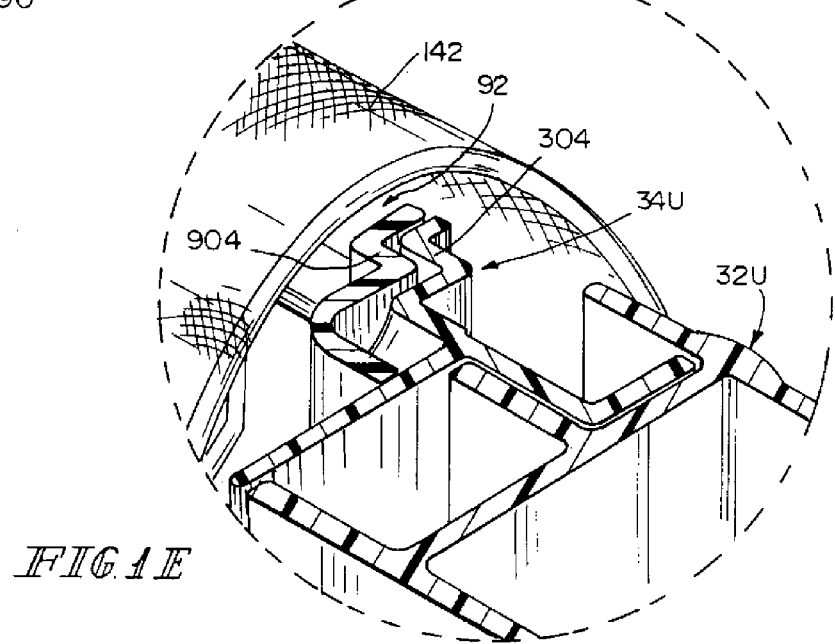

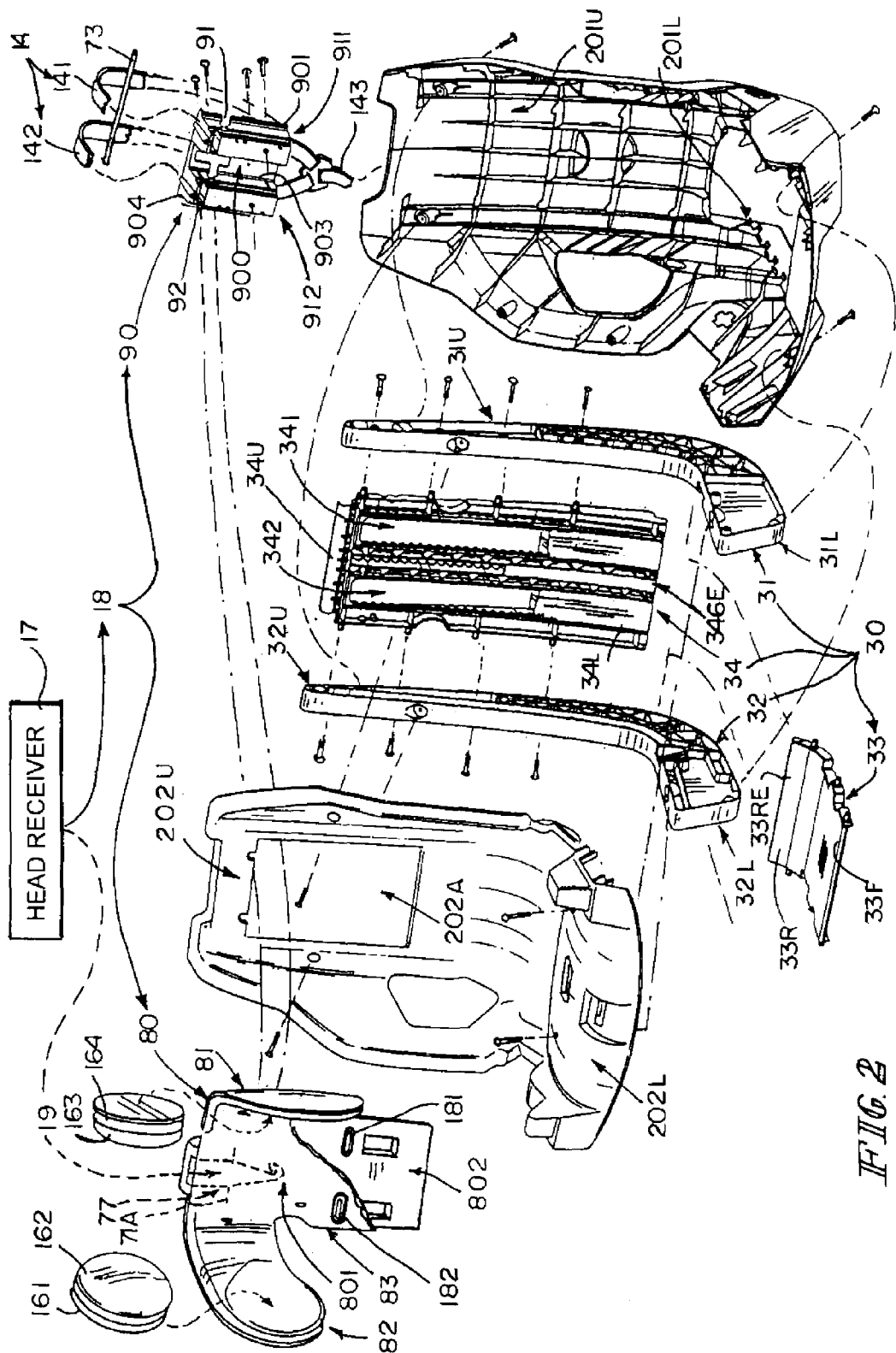

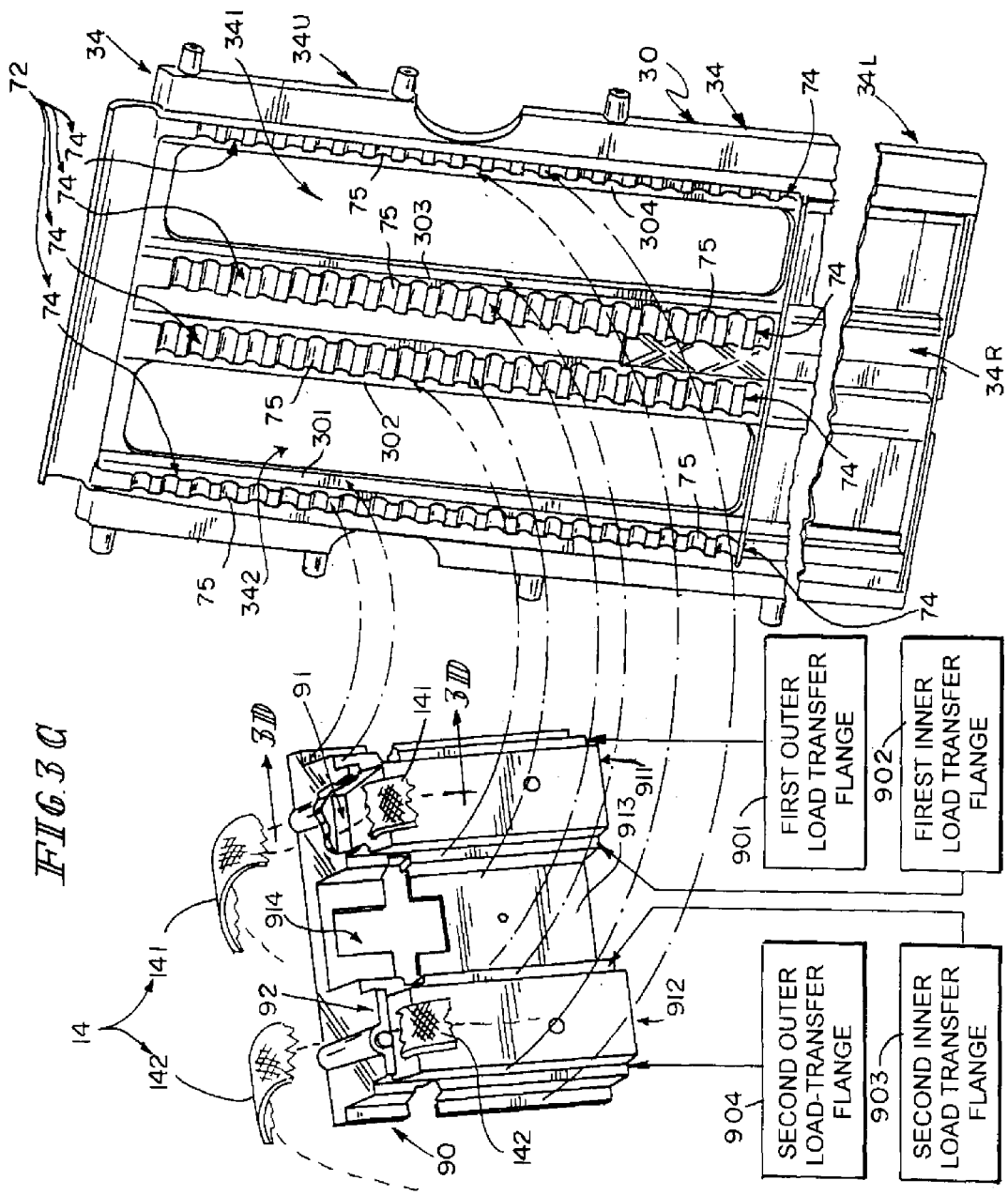

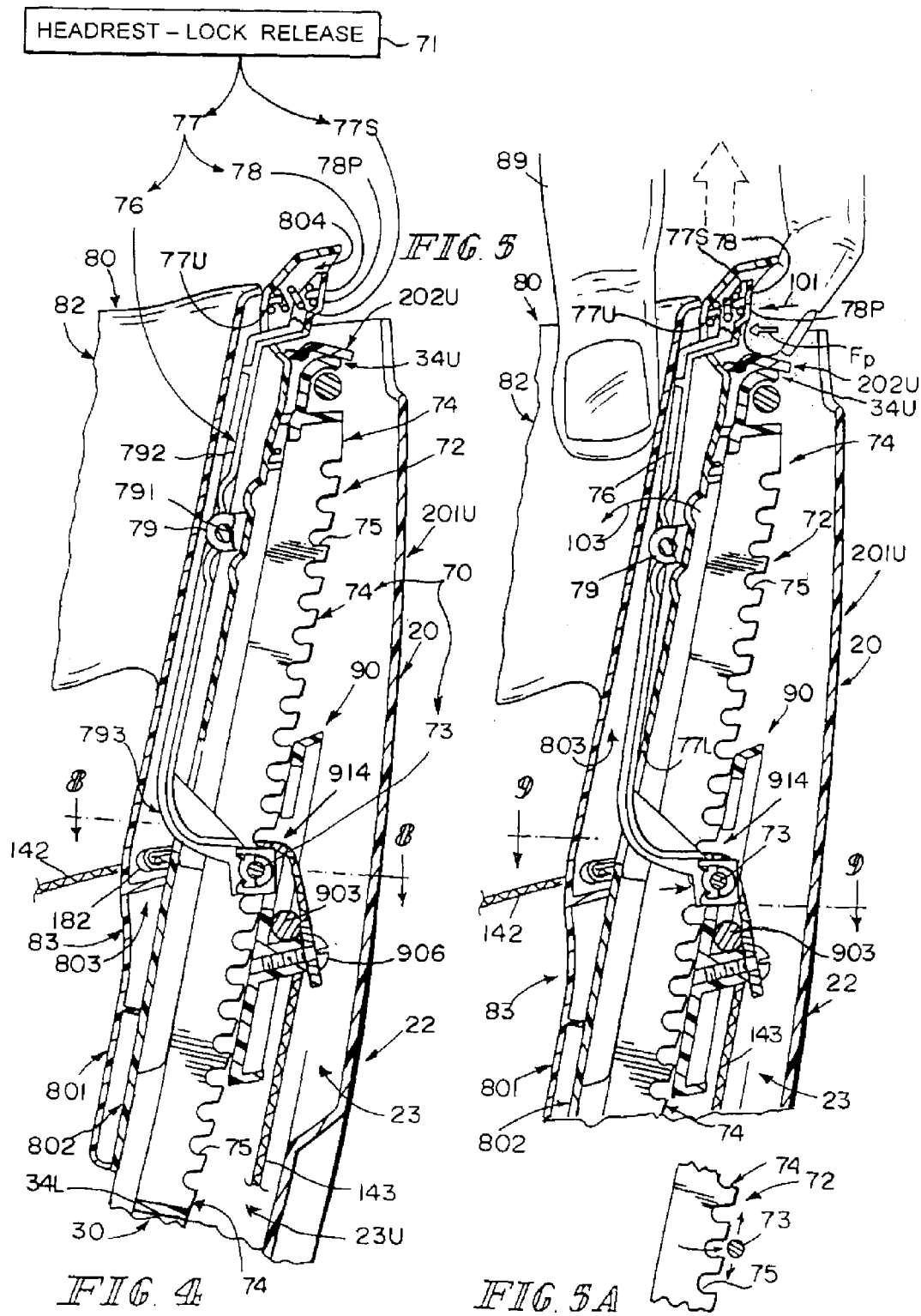

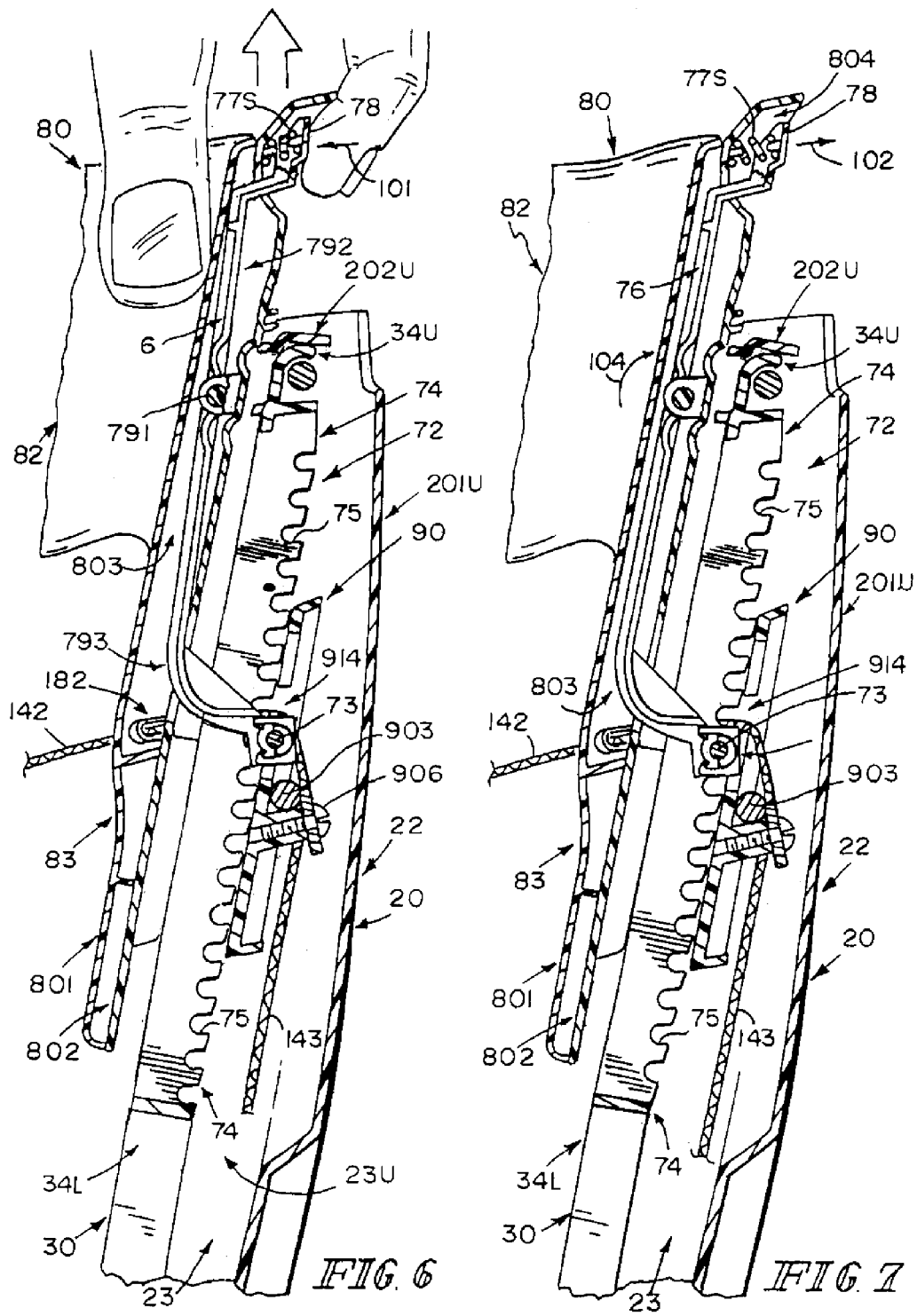

ADJUSTABLE HEADREST FOR JUVENILE VEHICLE

BACKGROUND

The present disclosure relates to child restraints, and in particular, to juvenile seats for use on passenger seats in vehicles. More particularly, the present disclosure relates to rigidifying structures included in juvenile seats.

SUMMARY

According to the present disclosure, a child restraint includes a juvenile seat and a child-restraint harness coupled to the juvenile seat. The juvenile seat includes a seat shell formed to include a seat bottom and a seat back extending upwardly from the seat bottom.

In illustrative embodiments, the seat back cooperates with the seat bottom to define an enclosed interior region of the hollow seat shell. The juvenile seat also includes a rigidifying truss located in the interior region of the hollow seat shell and coupled to the hollow seat shell to lie in a stationary position in the interior region.

In illustrative embodiments, the child restraint further includes a headrest coupled to the child-restraint harness and mounted for up-and-down movement on the rigidifying truss relative to the seat back. A first load-transfer flange included in the headrest is arranged to engage and slide on a first load-receiver rail included in the rigidifying truss during up-and-down movement of the headrest on the rigidifying truss. The headrest is configured to provide means for engaging the child-restraint harness to receive a load applied to the child-restraint harness by a seated child seated and restrained on the seat bottom of the juvenile seat during movement of the seated child relative to the juvenile seat in response to a sudden stop of a moving vehicle carrying the juvenile seat and for transferring the load from the headrest to the rigidifying truss located in the interior region of the hollow seat shell via a load-transfer path established by mating engagement of the first load-transfer flange included in the headrest and the first load-receiver rail included in the rigidifying truss.

In illustrative embodiments, the headrest includes a head cradle located on a front side of the seat back above the seat bottom to receive the head of a child seated in the juvenile seat. The headrest also includes a slidable cradle retainer located on an opposite back side of the seat back and coupled to the head cradle to move therewith during up-and-down movement of the headrest on the rigidifying truss relative to the seat back. The slidable cradle retainer is formed to include the first load-transfer flange and is coupled to the first and second shoulder belts and configured to provide means for transferring loads (applied by the first and second shoulder belts to the slidable cradle retainer in response to movement of the seated child relative to the juvenile seat to tension the first and second shoulder belts during exposure of a vehicle carrying the juvenile seat to an external impact) to the rigidifying truss via a load-transfer path established by mating engagement of the first load-transfer flange on the head cradle and the first load-receiver rail on the rigidifying truss.

In illustrative embodiments, the child restraint also includes a headrest-height controller including a headrest lock and a headrest-lock release. The headrest lock includes a rod receiver and a headrest-retainer rod. The rod receiver is coupled to the rigidifying truss and formed to include a series of rod-receiving notches. Each rod-receiving notch is located at a different elevation above the seat bottom. The headrest-retainer rod is arranged to lie and move in the interior region of the hollow seat shell relative to the rod receiver between a locked position extending into one of the rod-receiving notches formed in the rod receiver to retain the headrest in a selected position of the rigidifying truss to establish the elevation of the headrest above the seat bottom and an unlocked position disengaging the rod-receiving notches formed in the rod receiver to free the headrest for up-and-down movement on the headrest by a caregiver. The headrest-lock release includes a pivotable release lever arranged to extend through a lever-receiving aperture formed in the cradle retainer and to be moved therein by a user to move the headrest-retainer rod toward and away from the rod-receiving notches formed in the rod receiver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1C is an enlarged rear view of the hollow child restraint of FIGS. 1A and 1B with a portion of the bottom shell portion of the hollow seat shell removed to show a portion of a slidable cradle retainer included in the adjustable headrest coupled to first and second shoulder belts included in the child-restraint harness and mounted for up-and-down sliding movement on the upper beam stabilizer of the rigidifying truss during movement of the adjustable headrest relative to the hollow seat shell under the control of a headrest-height controller shown, for example, in FIGS. 3-7;

FIG. 1D is an enlarged partial perspective view taken from a circled region of FIG. 1C (with portions shown in section) showing mating engagement of a first outer load-transfer flange on a far side of the slidable cradle retainer with a first outer load-receiver rail formed in the upper beam stabilizer of the rigidifying truss and located near the first shoulder strap;

FIG. 1E is an enlarged partial perspective view taken from another circled region of FIG. 1C (with portions in section) showing mating engagement of a second outer load-transfer flange on a near side of the slidable cradle retainer with a second outer load-receiver rail formed in the upper beam stabilizer and located near the second shoulder strap;

FIG. 2 is an exploded perspective assembly view showing many of the components included in the child restraint of FIGS. 1A-1F and showing the two J-shaped stiffener beams that mate with the lower and upper beam stabilizers to form the rigidifying truss and separate top and bottom shell portions that can be mated to form the hollow seat shell surrounding the rigidifying truss and showing (on the far right) a slidable cradle retainer included in the adjustable headrest (and coupled to a child-restraint harness) and configured to be mounted on the rearwardly facing four load-receiver rails of the upper beam stabilizer of the rigidifying truss as suggested in FIGS. 1C-1E and fastened to the head cradle to move up and down therewith relative to the seat back of the hollow seat shell as suggested in FIGS. 4-7;

FIG. 3C is an enlarged perspective assembly view of the upper beam stabilizer (on the right) and the slidable cradle retainer (on the left) and showing first and second shoulder straps passing through first and second shoulder belt-travel slots formed in the slidable cradle retainer and four notched plates included in the headrest lock and coupled to the upper beam stabilizer and formed to include rod-receiving notches sized to receive therein the headrest-retainer rod also included in the headrest lock showing four spaced-apart load-transfer flanges formed on the slidable cradle retainer and showing a first outer load-receiver rail along a left edge of the first (left-side) belt-travel channel and a first inner load-receiver rail along a right edge of the first belt-travel channel and showing a second inner load-receiver rail along a left edge of the second (right-side) belt-travel channel and a second outer load-receiver rail along a right edge of the second belt-travel channel;

FIGS. 4-7 suggest an illustrative series of steps by which a caregiver may change the vertical position of the adjustable headrest relative to the seat back of the juvenile seat using the actuator included in the headrest-height controller;

FIG. 4 is an enlarged sectional view taken along line 4-4 of FIG. 1A showing the position of the adjustable headrest in a lowered position and showing that the headrest-retainer rod coupled to the lower end of the release lever is engaged in a rod-receiving notch formed in a notched plate coupled to the upper beam stabilizer to retain the headrest in the lowered position and thereby block up-and-down movement of the headrest relative to the seat back;

FIG. 5 is a view similar to FIG. 4 showing a hand of a caregiver applying a push force in a forward direction (to the left) to the PUSH handle to pivot the release lever in a counterclockwise direction about a pivot axis established by the pivot mount to cause the headrest-retainer rod to move out of engagement with the rod-receiving notch to establish a disengaged position of the headrest-retainer rod;

FIG. 5A is a portion of the view shown in FIG. 5 showing that the headrest-rod retainer is in the disengaged position and free to move up and down relative to the notched plate coupled to the upper beam stabilizer;

FIG. 6 is a view similar to FIG. 5 showing the hand of the caregiver still applying the push force in the forward direction to the PUSH release lever keeping the headrest-retainer rod in the disengaged position throughout upward movement of the movable headrest to a raised position;

FIG. 7 is a view similar to FIG. 6 showing the headrest in a raised position and showing that the hand of the caregiver has been removed from the release lever to allow a return spring included in the headrest lock and coupled to the PUSH handle to pivot the release lever about the pivot axis in a clockwise direction to urge the headrest-retainer rod into contact with the rod-receiving notches formed in the notched plates coupled to the upper beam stabilizer to establish a normally engaged position of the headrest-retainer rod and thereby block up-and-down movement of the adjustable headrest on the upper beam stabilizer relative to the seat back;

DETAILED DESCRIPTION

Figure 1A:
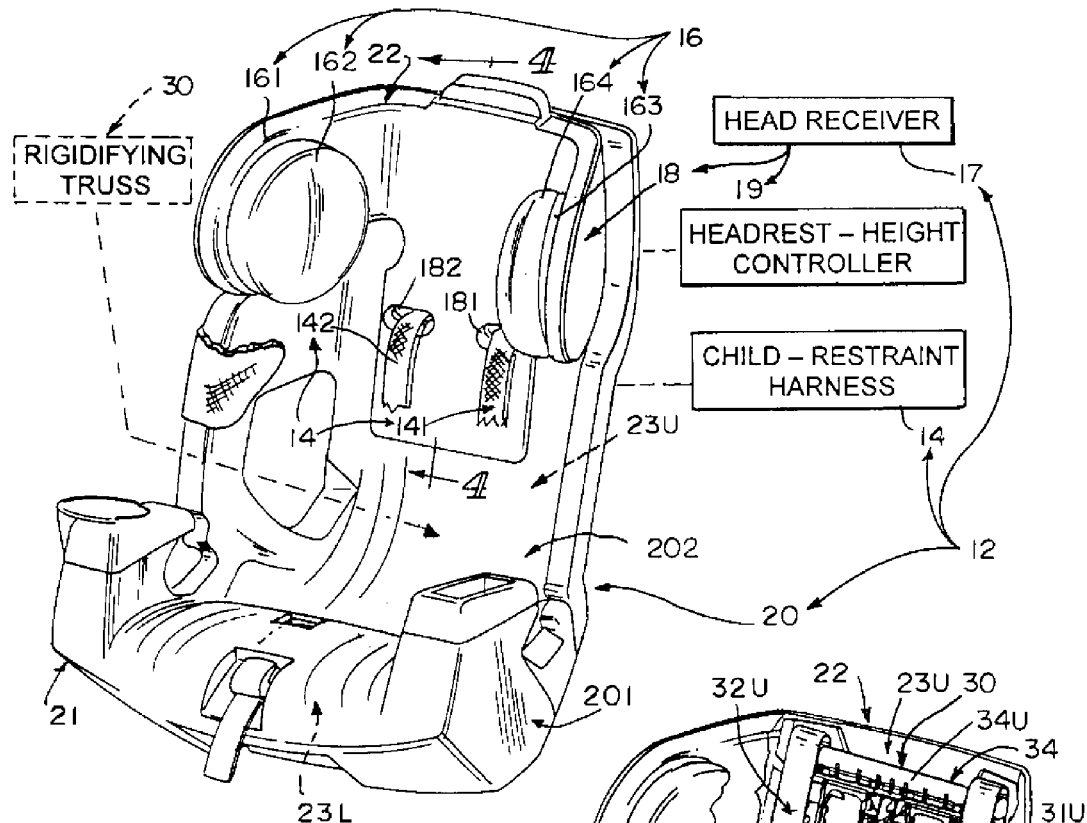
FIG. 1A is a perspective view of a child restraint in accordance with the present disclosure for use on a passenger seat in a vehicle, with portions of a fabric covering broken away, showing a juvenile seat comprising a hollow seat shell including a seat bottom and a seat back extending upwardly from the seat bottom and a rigidifying truss (shown diagrammatically) mounted in an interior region of the hollow seat shell and coupled to the hollow seat shell to rigidify the juvenile seat and also showing a headrest-height controller (shown diagrammatically) and a head cradle included in an adjustable headrest mounted for up-and-down movement on the seat back under the control of the headrest-height controller that is shown illustratively in FIG. 3B and in operation in FIGS. 4-7.
Figure 1B:
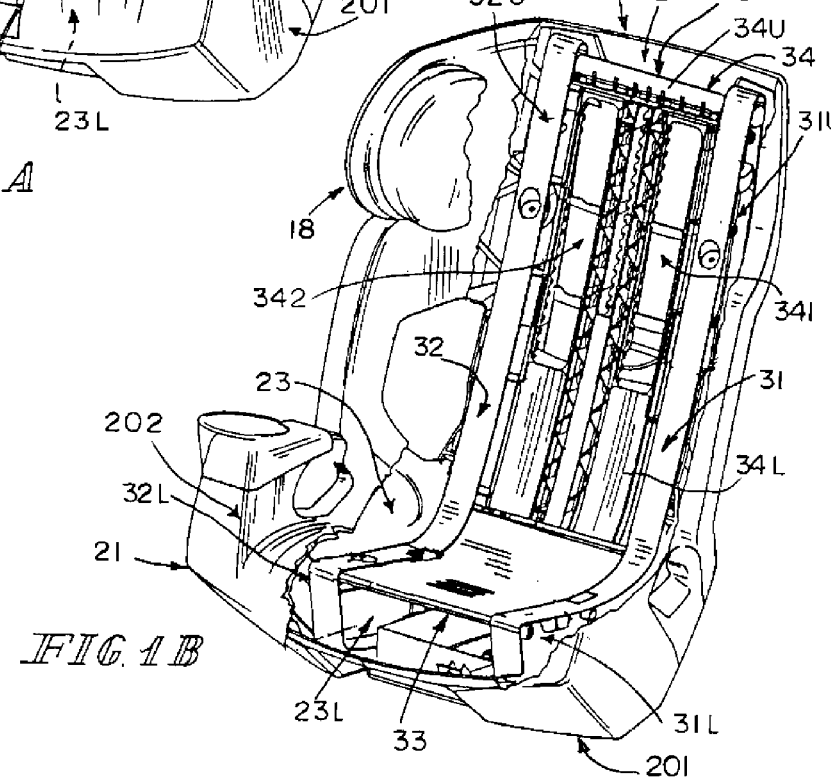
FIG. 1B is a perspective view similar to FIG. 1 with portions broken away to reveal an illustrative four-part rigidifying truss anchored to the hollow seat shell and configured (as shown in more detail in FIG. 4) to include J-shaped first and second stiffener beams, a lower beam stabilizer arranged to lie in a cavity formed in the seat bottom and extend laterally between lower portions of the first and second stiffener beams, and an upper beam stabilizer arranged to lie in a cavity formed in the seat back and extend laterally between upper portions of the first and second stiffener beams.

An illustrative child restraint 10 comprises juvenile seat 12 and a child-restraint harness 14 coupled to juvenile seat 12 as suggested in FIG. 1. In illustrative embodiments, juvenile seat 12 includes hollow seat shell 20 and a rigidifying truss 30 located inside hollow seat shell 20 as suggested diagrammatically in FIG. 1A and illustratively in FIGS. 1B, 1C, and 2. Juvenile seat 12 also includes a head receiver 17 coupled to rigidifying truss 30 as suggested in FIGS. 3A and 3C and mounted for up-and-down movement on rigidifying truss 30 and relative to seat shell 20 at the option of a caregiver as suggested in FIGS. 4-7.

Head receiver 17 includes a headrest 18 coupled to child-restraint harness 14 and mounted for up-and-down movement on rigidifying truss 30 and relative to seat shell 20 as suggested in Figs. 1A and 4-7. Headrest 18 is coupled to first and second shoulder belts 141, 142 as suggested in FIGS. 1A-1C. In illustrative embodiments, several load-transfer flanges 901-904 included in headrest 18 slide on companion load-receiver rails 301-304 included in rigidifying truss 30 during up-and-down movement of headrest 18 on rigidifying truss 30 as suggested in FIGS. 1F and 3C. During a sudden stop of any vehicle carrying child restraint 10, all loads applied to child-restraint harness 14 as a result of relative movement of juvenile seat 12 and a child seated and restrained in juvenile seat 12 will be transferred to rigidifying truss 30 by child-restraint harness 14 to headrest 18 and then by load-transfer flanges 901-904 in headrest 18 to load-receiver rails 301-304 in the rigidifying truss 30 located inside hollow seat shell 20.

Head receiver 17 also includes a headrest-height controller 19 coupled to headrest 18 to move up and down therewith and shown diagrammatically in FIG. 1A and illustratively in FIGS. 3A and 4-7. In illustrative embodiments, headrest-height controller 19 includes an actuator 77 comprising a PUSH handle 78 and a release lever 76 as suggested in FIGS. 3A, 3B, and 4. Release lever 76 is mounted on an actuator support 79 coupled to headrest 18 for pivotable movement about a pivot axis 71A as suggested in FIGS. 3A and 3B in response to application of a pushing force $F_P$ by a caregiver to PUSH handle 78 to cause movement of a headrest-retainer rod 73 into and out of a rod receiver 72 coupled to rigidifying truss 30 as suggested in FIGS. 4, 5, and 5A to free headrest 18 for up-and-down movement on rigidifying truss 30 and relative to a seat back 22 included in hollow seat shell 20 as suggested in FIGS. 4-7.

Hollow seat shell 20 includes a seat bottom 21 and a seat back 22 extending upwardly from seat bottom 21 as shown, for example, in FIGS. 1 and 2. Seat back 22 cooperates with seat bottom 21 to define an enclosed interior region 23 containing rigidifying truss 30 as suggested in FIGS. 1A and 1B. Rigidifying truss 30 is coupled to seat bottom and back 21, 22 as suggested in FIG. 2 to lie in a stationary position in interior region 23 of hollow seat shell 20 as suggested in FIGS. 1B and 1C.

Figure 3A:
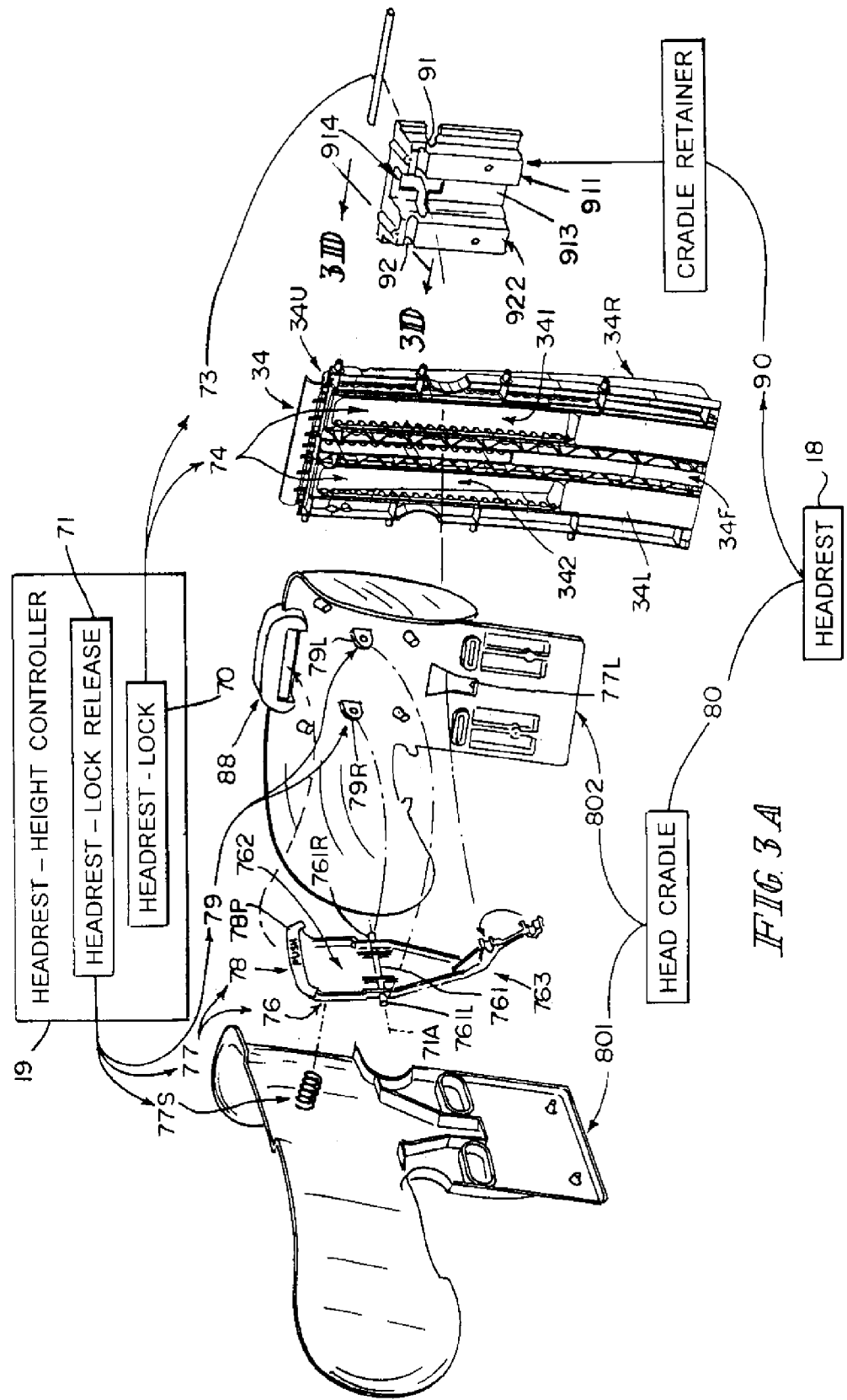
FIG. 3A is an enlarged exploded perspective assembly view showing the upper beam stabilizer included in the rigidifying truss and showing that the headrest-height controller includes a headrest lock associated with the upper beam stabilizer and a headrest-lock release associated with the outer and inner plates included in a head cradle provided in the adjustable headrest.
Figure 3B:
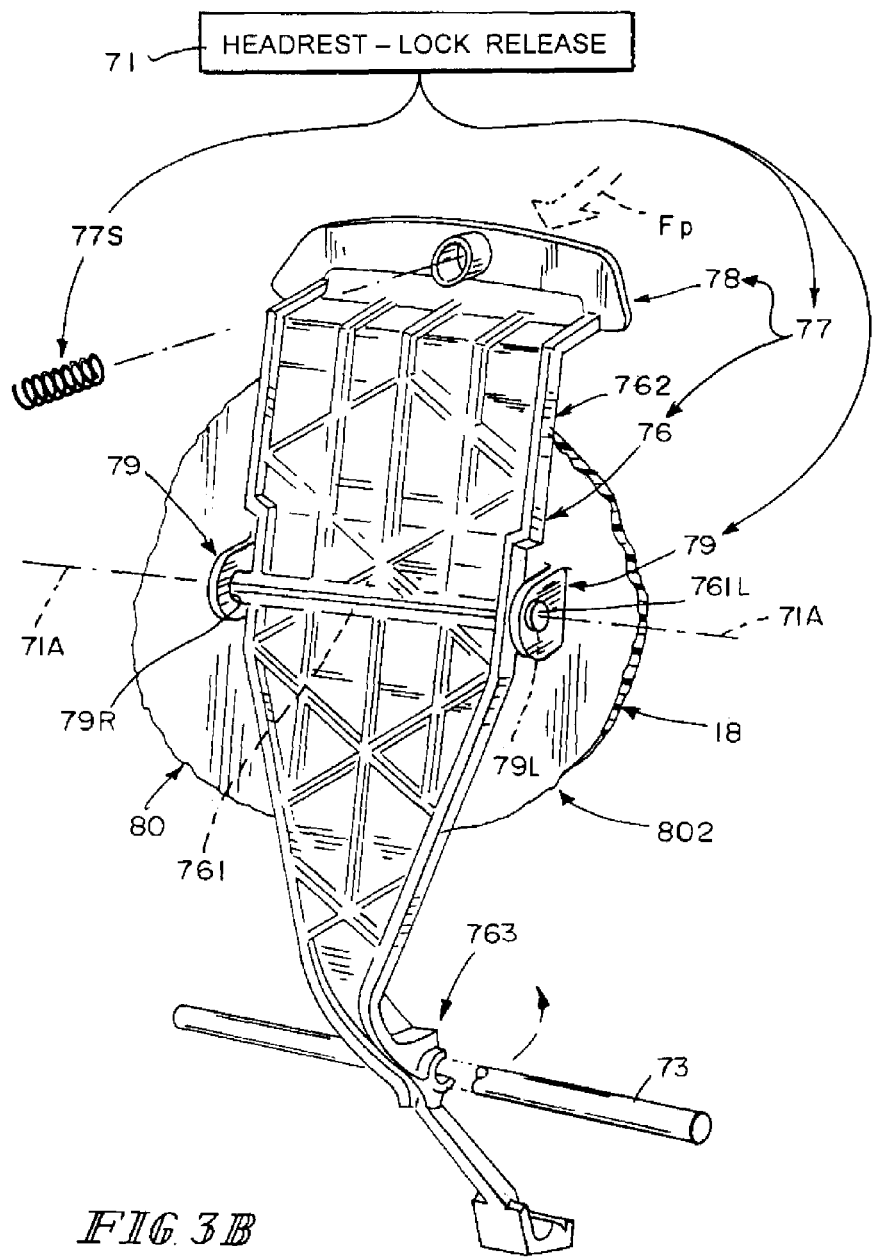
FIG. 3B is an enlarged perspective view of components included in the headrest-lock release showing that an actuator included in the headrest-lock release includes a PUSH handle and a release lever arranged to extend downwardly from the PUSH handle to mate with the headrest-retainer rod of the headrest lock and adapted to be mounted for pivotable movement on a pivot mount coupled to the inner plate of the head cradle to move the headrest-retainer rod relative to rod-receiving notches formed in the upper beam stabilizer as suggested in FIGS. 4-7.
Figure 3D:
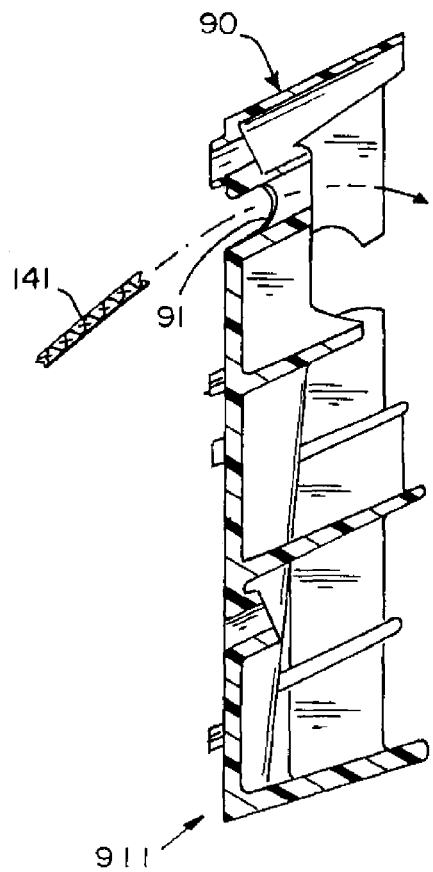
FIG. 3D is an enlarged sectional view taken along line 3D-3D in FIG. 3C.

Rigidifying truss 30 includes first and second stiffener beams 31, 32, a lower beam stabilizer 33, and an upper beam stabilizer 34 in an illustrative embodiment as suggested in FIG. 3. Lower beam stabilizer 33 is located between and coupled to lower portions 31L, 32L of first and second stiffener beams 31, 32 as suggested in FIGS. 1B and 2. Upper beam stabilizer 34 is located between and coupled to upper portions 31U, 32U of first and second stiffener beams 31, 32 as suggested in FIGS. 1B, 1C, and 2.

In illustrative embodiments, headrest 18 is coupled to upper beam stabilizer 34 of rigidifying truss 30 as suggested in FIG. 3A. Headrest 18 is mounted for up-and-down movement on upper beam stabilizer 34 at the option of a caregiver operating headrest-height controller 19 as suggested in FIGS. 4-7.

Headrest 18 includes a head cradle 80 and a cradle retainer 90 as suggested in FIGS. 2 and 3A. Cradle retainer 90 is configured to mate with and slide on load-receiver rails 301-304 included in upper beam stabilizer 34 and to support head cradle 80 so that head cradle 80 moves up and down relative to sent bottom 21 whenever cradle retainer 90 moves up and down relative to seat back 22 as suggested in FIGS. 1F and 3C. Head cradle 80 moves up and down along a front face 34F of upper beam stabilizer 34 while cradle retainer 90 is tethered to head cradle 80 for up-and-down movement along a rear face 34R of upper beam stabilizer 34 as suggested in FIGS. 1F and 3A.

Load-transfer flanges 901-904 included in cradle retainer 90 engage and slide on companion load-receiver rails 301-304 included in upper beam stabilizer 34 during up-and-down movement of cradle retainer 90. During a sudden vehicle stop described herein, loads applied by a child seated and restrained in juvenile seat 12 will be transferred to upper beam stabilizer 34 included in rigidifying truss 30 and located in interior region 23 of hollow seat shell 20.

Head cradle 80 comprises an inner shell 802 and an outer shell 801 as shown, for example, in FIGS. 2A and 3A Inner shell 802 is located alongside a front face of upper beam stabilizer 34 as suggested in FIG. 3A. Outer shell 801 is arranged to lie in spaced-apart relation to upper beam stabilizer 34 of rigidifying truss 30 to locate inner shell 802 therebetween as also suggested in FIGS. 2, 3A, and 4.

Cradle retainer 90 is mounted for up-and-down sliding movement on rear face 34R of upper beam stabilizer 34 of rigidifying truss 30 during movement of headrest 18 relative to seat shell 20 along front face 34F of upper beam stabilizer 34 under the control of headrest-height controller 19 as shown, for example, in FIGS. 4-7. Slidable cradle retainer 90 is configured to be mounted on a rearwardly facing surface 34R of upper beam stabilizer 34 of rigidifying truss 30 to place load-transfer flanges 901-904 in mating engagement with companion load-receiver rails 301-304 as suggested in FIGS. 1C and 3C. Cradle retainer 90 is also fastened to the head cradle 80 to move up and down therewith relative to upper beam stabilizer 34 and to seat back 22 of hollow seat shell 20 as suggested in FIGS. 4-7. Cradle retainer 90 is also coupled to first and second shoulder belts 141, 142 included in a child-restraint harness 14 included in child restraint 10 and used to restrain a child sitting on seat shell 20 as suggested in FIGS. 1C, 2, and 3C.

Headrest-height controller 19 includes a headrest lock 70 and a headrest-lock release 71 as suggested in FIG. 3A. A caregiver can operate headrest-height controller 19 as suggested in FIGS. 4-7 to lock headrest 18 to upper beam stabilizer 34 of rigidifying truss 30 in a selected elevated position on seat back 22 or unlock headrest 18 to disengage upper beam stabilizer 34 so that headrest 18 can be moved up or down on seat back 22 to a new selected elevated position.

Headrest lock 70 includes a rod receiver 72 and a headrest-retainer rod 73 as suggested in FIG. 1C. Rod receiver 72 is coupled to upper beam stabilizer 34 as suggested in FIG. 3C. In illustrative embodiments, rod receiver 72 comprises several rearwardly extending notched plates 74 coupled to upper beam stabilizer 34 and formed to include rod-receiving notches 75 as suggested in FIGS. 1C and 3C. Each rod-receiving notch 75 is sized to receive headrest-retainer rod 73 therein as suggested in FIGS. 1C and 1F. In illustrative embodiments, movable headrest-retainer rod 73 and notched plates 74 cooperate to define a headrest lock 70 included in headrest-height controller 19.

A headrest-lock release 71 is also included in headrest-height controller 19 and configured to interact with headrest lock 70 to free headrest 18 to be moved up and down on upper beam stabilizer 34 of rigidifying truss 30 and relative to seat back 22 by a caregiver as suggested in FIGS. 4-7. In illustrative embodiments, headrest-lock release 71 includes PUSH handle 78 and release lever 76 as suggested in FIGS. 3A and 3B. Release lever 76 is mounted on actuator support 70 for pivotable movement about pivot axis 71A and is coupled to headrest-retainer rod 73 of headrest lock 70 as suggested in FIGS. 3A and 3B. In use, a caregiver can pivot release lever 76 about pivot axis 71A to cause headrest-retainer rod 73 to move relative to upper beam stabilizer and either engage or disengage rod receiver 72 (e.g., rod-receiving notches 75 in notched plate(s) 74) as suggested in FIGS. 4-7.

An illustrative series of steps by which a caregiver may change the vertical position of the movable headrest 18 relative to seat back 22 of juvenile seat 12 using actuator 77 included in headrest-height controller 19 is suggested in FIGS. 4-7. In use, cradle retainer 90 of headrest 18 rides up and down on rear face 34R of upper beam stabilizer 34 of rigidifying truss 30 to cause head cradle 80 of headrest 18 to move up and down along seat back 22 relative to seat bottom 21. The caregiver can push inwardly on PUSH handle 78 of actuator 77 to unlock headrest lock 70 in headrest-height controller 19 and then lift or lower headrest 18 to change the vertical position of headrest 18 along seat back 22.

Headrest 18 is shown in a lowered position on seat back 22 in FIG. 4. Headrest-retainer rod 73 is coupled to the lower end of the release lever 76 included in actuator 77 and is engaged in a rod-receiving notch 75 formed in a notched plate 74 coupled to upper beam stabilizer 34 to retain headrest 18 in the lowered position and thereby block up-and-down movement of headrest 18 relative to seat back 22.

As suggested in FIG. 5, a hand of a caregiver applies a push force $F_P$ in a forward direction 101 (to the left) to PUSH handle 78 to pivot release lever 76 in a counterclockwise direction 103 about pivot axis 71A established by actuator support 79 to cause headrest-retainer rod 73 to move out of engagement with rod-receiving notch 75 to establish a disengaged position of headrest-retainer rod 73. As suggested in FIG. 5A, headrest-rod retainer 73 is in the disengaged position and free to move up and down relative to notched plate 74 coupled to upper beam stabilizer 34.

As suggested in FIG. 6, the hand of the caregiver still applies the push force $F_P$ in forward direction 101 to PUSH handle 78 to pivot release lever 76 to keep headrest-retainer rod 73 in the disengaged position throughout upward movement of movable headrest 18 along seat back 22 to a raised position. The caregiver can now lift headrest 18 upwardly away from seat bottom 21 or lower headrest 18 downwardly along seat back 22 toward seat bottom 21.

Headrest 18 is shown in a raised position on seat back 22 in FIG. 7. The hand of the caregiver has been removed from PUSH handle 78 of actuator 74 to allow a return spring 77S included in headrest lock 70 and coupled to PUSH handle 78 to pivot release lever 76 about pivot axis 71A in a clockwise direction 104 to urge headrest-retainer rod 73 into contact with rod receiver 72 and, for example, into rod-receiving notches 75 formed in notched plates 74 to establish a normally engaged position of headrest-retainer rod 73 and thereby block up-and-down movement of movable headrest 18 relative to seat bottom 21 and along seat back 22.

Hollow seat shell 20 includes a bottom shell portion 201 and a top shell portion 202 in illustrative embodiments as suggested in FIGS. 1A and 3. Top shell portion 202 is coupled to bottom shell portion 201 to form the enclosed interior region 23 therebetween. A bottom cavity 23L of interior region 23 is formed in seat bottom 21 when bottom and top shell portions 201, 202 are mated. A back cavity 23U of interior region 23 is formed in seat back 22 to communicate with bottom cavity 23L and to provide a space large enough to contain rigidifying truss 30 therein when bottom and top shell portions 201, 202 are mated.

Rigidifying truss 30 is a modular component configured to be mounted in interior region 23 of hollow seat shell 20 to rigidify seat shell 20 and is shown, for example, in FIG. 4. First and second stiffener beams 31, 32 are arranged to lie in laterally spaced-apart relation to one another in interior region 23. Lower beam stabilizer 33 is arranged to interconnect lower portions 31L, 32L of first and second stiffener beams 31, 32 to retain those lower portions 31L, 32L in fixed relation to one another. Upper beam stabilizer 34 is arranged to interconnect upper portions 31U, 32U of first and second stiffener beams 31, 32 to retain those upper portions 31U, 32U in fixed relation to one another and to lower portions 31L, 32L of first and second stiffener beams 31, 32. In an illustrative embodiment, each of truss components 31-34 is made of a glass-filled polypropylene material while bottom and top shell portions 201, 202 are made of a polypropylene material.

Once rigidifying truss 30 is placed between bottom and top shell portions 201, 202 and coupled to bottom shell portion 201 and top shell portion 202 is coupled to bottom shell portion 201, then rigidifying truss 30 is retained in interior region 23 of the two-part seat shell 20 to rigidify seat shell 20. As suggested in FIG. 2, lower beam stabilizer 33 is located in bottom cavity 23L of interior region 23 formed in seat bottom 21 and upper beam stabilizer 34 is located in back cavity 23U of interior region 23 formed in seat back 22 and coupled to head receiver 17.

Each of first and second stiffener beams 31, 32 is substantially J-shaped to resemble a hockey stick as shown, for example, in FIG. 3A. Lower portions 31L, 32L of stiffener beams 31, 32 lie in bottom cavity 23L while upper portions 31U, 32U of stiffener beams 31, 32 lie in back cavity 23U as suggested in FIG. 2.

Lower beam stabilizer 33 includes a front panel 33F and a rear panel 33R as shown, for example, in FIG. 2. Front panel 33F is arranged to lie in a substantially horizontal plane between first and second stiffener beams 31, 32 as suggested in FIG. 2. Rear panel 33R is appended to front panel 33F and arranged to extend upwardly from front panel 33F in a direction toward upper beam stabilizer 34 as also suggested in FIG. 2.

Rear panel 33R of lower beam stabilizer 33 is curved and formed to include a concave surface arranged to face toward a child seated on seat bottom 21 of juvenile seat 12. Rear panel 33R of lower beam stabilizer 33 terminates at a rear edge 33RE that is arranged to extend between first and second stiffener beams 31, 32 as suggested in FIG. 2. Upper beam stabilizer 34 includes a lower edge 34LE that is arranged to extend between first and second stiffener beams 31, 32 and mate with rear edge 33RE of rear panel 33R of lower beam stabilizer 33 as suggested in FIG. 2.

Upper beam stabilizer 34 includes an upper panel 34U and a lower panel 34L as shown for example in FIG. 2. Upper panel 34U is formed to include a pair of upwardly extending and laterally spaced-apart belt-travel channels 341, 342 as shown, for example, in FIGS. 2, 3A, and 3C. Lower panel 34L is arranged to extend downwardly from upper panel 34U toward lower beam stabilizer 33. Each of the belt-travel channels 341, 342 is configured to provide means for receiving therein a shoulder belt 141, 142 included in a child-restraint harness 14 coupled to juvenile seat 12 as suggested in FIG. 1C.

Figure 1F:
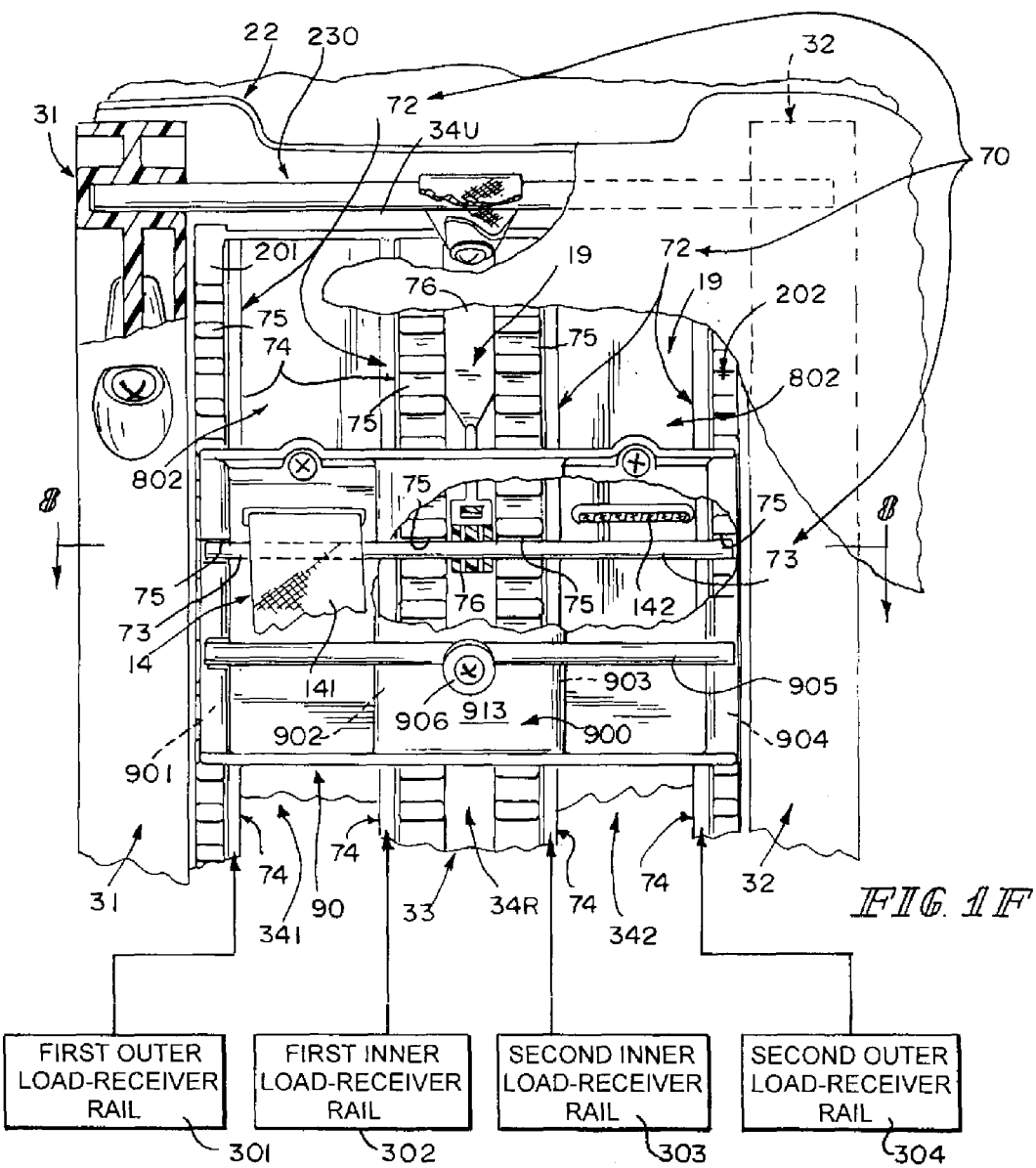
FIG. 1F is an enlarged rear view of the child restraint of FIGS. 1A-1C, with a portion of the bottom shell portion removed to show a portion of the slidable cradle retainer of the adjustable headrest coupled to first and second shoulder belts included in the child-restraint harness and mounted for up-and-down sliding movement on four load-receiver rails formed in the upper beam stabilizer of the rigidifying truss during movement of the headrest relative to the hollow seat shell and showing that first outer and inner load-receiver rails included in the upper beam stabilizer border a first belt-travel channel formed in the upper beam stabilizer to receive the first shoulder belt therein during up-and-down movement of the slidable cradle retainer on the upper beam stabilizer and that second outer and inner load-receiver rails included in the upper beam stabilizer border a second belt-travel channel formed in the upper beam stabilizer to receive the second shoulder belt therein during up-and-down movement of the slidable cradle retainer on the upper beam stabilizer.

Several load-receiver rails 301-304 are included in upper beam stabilizer 34 of rigidifying truss 30 and arranged to engage companion load-transfer flanges 901-904 included in slidable cradle retainer 90 to support cradle retainer 90 for up-and-down sliding movement of a rear face 34R of upper beam stabilizer 34 as suggested in FIGS. 1F and 3C. In an illustrative embodiment, a first outer (first) load-receiver rail 301 is arranged to extend along a left edge of first belt-travel channel 341 and a first inner (second) load-receiver rail 302 is arranged to extend along a right edge of first belt-travel channel 341 and lie in spaced-apart parallel relation to first outer (first) load-receiver rail 301 as suggested in FIGS. 1F and 3C. A second inner (third) load-receiver rail 303 is arranged to extend along a left edge of second belt-travel channel 342 and a second outer (fourth) load-receiver rail 304 is arranged to extend along a right edge of second belt-travel channel 342 and lie in spaced-apart parallel relation to second outer (third)

load-receiver rail 303 as also suggested in FIGS. 1F and 3C. Each notched plate 74 in a first pair of notched plates 74 included in headrest lock 70 and associated with first belt-travel channel 341 is arranged to lie in spaced-apart relation to one another to locate first outer and inner load-receiver rails 301, 302 therebetween as shown in FIG. 3C. Each notched plate 74 in a second pair of notched plates 74 included in headrest lock 70 and associated with second belt-travel channel 342 is arranged to lie in spaced-apart relation to one another to locate second inner and outer load-receiver rails 303, 304 therebetween as also shown in FIG. 3C.

Hollow seat shell 20 includes a bottom shell portion 201 and a top shell portion 202 coupled to bottom shell portion 201 to form bottom and back cavities 23L, 23U of interior region 23 therebetween. The external shape and configuration of bottom and top shell portions 201, 202 can be varied within the scope of this disclosure to suit various consumer needs and preferences while the hollow seat shell 20 defined by mating engagement of bottom and top shell portions 201, 202 is rigidified by a common rigidifying truss 30 mounted in interior region 23 of hollow seat shell 20.

Bottom shell portion 201 includes a bottom frame 201L and a back frame 201U as suggested in FIG. 2. Bottom frame 201L is coupled to lower portions 31L, 32L of first and second stiffener beams 31, 32 to rigidify seat bottom 21 of hollow seat shell 20. Back frame 201U is coupled to upper portions 31L, 32L of first and second stiffener beams 31, 32 to rigidify seat back 22 of the hollow seat shell 20.

Top shell portion 202 includes a seat pad 202L and a backrest 202U as suggested in FIG. 2. Seat pad 202L is arranged to lie in spaced-apart relation to bottom frame 201L to locate lower portions 31L, 32L of first and second stiffener beams 31, 32 therebetween as suggested in FIG. 2. Backrest 202U is arranged to lie in spaced-apart relation to back frame 201U to locate upper portions 31U, 32U of the first and second stiffener beams 31, 32 therebetween as suggested in FIG. 2 and coupled to upper portions 31U, 32U of first and second stiffener beams 31, 32 to rigidify seat back 22 of hollow seat shell 20.

Head receiver 17 of juvenile seat 12 includes an adjustable headrest 18 and a headrest-height controller 19 as suggested in FIG. 3A. Adjustable headrest 18 is mounted for up-and-down movement on upper beam stabilizer 34 and relative to seat back 22 and above seat bottom 21. Headrest-height controller 19 is configured and arranged to adjust the height of headrest 18 above seat bottom 21. Headrest-height controller 19 includes a headrest lock 70 and a headrest-lock release 71 as suggested in FIG. 3A.

Headrest lock 70 includes a rod receiver 72 and a headrest-retainer rod 73 as suggested in FIGS. 1C, 1F, and 2. Rod receiver 72 is coupled to upper beam stabilizer 34 as suggested in FIG. 1C. Headrest-retainer rod 73 is coupled to headrest-lock release 71 to move therewith relative to rod receiver 72 and upper beam stabilizer 34 under the control of a caregiver to free headrest 18 to be raised and lowered on upper beam stabilizer 34 and relative to seat back 22.

Rod receiver 72 is coupled to a rear portion of upper panel 34U of upper beam stabilizer 34 and arranged to extend away from backrest 202U of top shell portion 202 as suggested in FIG. 2. Rod receiver 72 includes one or more notched plates 74 formed to include a series of rod-receiving notches 75 having openings facing away from backrest 202U of top shell portion 202 and toward back frame 201U of bottom shell portion 201 as suggested in FIG. 2. Each rod-receiving notch 75 formed in notched plate 74 is located at a different elevation above seat bottom 21 as suggested in FIG. 1B.

Headrest-retainer rod 73 is arranged to move relative to rod receiver 72 between a locked position engaging a selected first of rod-receiving notches 75 of rod receiver 72 to retain headrest 18 in a selected position on upper beam stabilizer 34 relative to seat back 22 to establish the elevation of headrest 18 above seat bottom 21 and an unlocked position disengaging rod-receiving notches 75 formed in rod receiver 72 to free headrest 18 for up-and-down movement on upper beam stabilizer 34 relative to seat back 22 to assume a different selected fixed position on upper beam stabilizer 34 and relative to seat back 22 associated with a selected second of rod-receiving notches 75 to establish a new elevation of headrest 18 above seat bottom 21. Headrest-lock release 71 is configured to be operated by a caregiver to move headrest-retainer rod 73 toward and away from rod-receiving notches 75 formed in notched plates 74 as suggested in FIGS. 4-7.

Headrest-lock release 71 includes a pivot mount 79 coupled to inner plate 802 of headrest 18 and a release lever 76 as suggested in FIGS. 3A and 3B. Release lever 76 is mounted on pivot mount 79 for movement on and relative to headrest 18 in response to application of a force to PUSH handle 78 coupled to release lever 76 by a caregiver to move headrest-retainer rod 73 in a direction away from the rear portion of upper panel 34U of upper beam stabilizer 34 and relative to rod receiver 72 from the locked position to the unlocked position.

As suggested in FIGS. 1A, 1C, 2, and 3A, headrest 18 includes a head cradle 80 and a slidable cradle retainer 90. Cradle retainer 90 is coupled to head cradle 80 to move therewith on upper beam stabilizer 34 and relative to seat back 22 and to retain head cradle 80 in tethered relation to seat back 22 while allowing up-and-down movement of head cradle 80 relative to seat back 22. In an illustrative embodiment, head cradle 80 includes a front plate 801 coupled to a rear plate 802 to form an open space 803 therebetween as suggested in FIGS. 1C, 3A, and 4-7.

Upper panel 34U of upper beam stiffener 34 is formed to include a pair of upwardly extending and laterally spaced-apart belt-travel channels 341, 342 shown, for example, in FIGS. 1B and 2. These belt-travel channels 341, 342 are provided so that shoulder belts 141, 142 in child-restraint harness 14 can pass between front and rear sides of seat shell 20 and front and rear faces 34F, 34R of upper beam stabilizer 34. Headrest 18 is aligned with seat back 22 so that belt-receiving slots 181, 182 formed in head cradle 80 and belt-receiving slots 91, 92 formed in slidable cradle retainer 90 of headrest 18 are always aligned with belt-travel channels 341, 342 formed in upper panel 34U of upper beam stabilizer 34 regardless of the elevation position of headrest 18 on seat back 22. Backrest 202U of top shell portion 202 is formed to include an aperture 202A aligned to communicate with belt-travel channel 341, 342 as suggested in FIGS. 1B and 2.

A first shoulder belt 141 included in child-restraint harness 14 is arranged to extend through first belt-travel channel 341 as suggested in FIGS. 1A, 1B, and 1C. First shoulder belt 141 is also arranged to extend through a first shoulder belt-receiving slot 181 formed in head cradle 80 of headrest 18 as suggested in FIG. 1A and through a first shoulder belt-receiving slot 91 formed in slidable cradle retainer 90 of headrest 18 as suggested in FIGS. 1C, 1D, and 1F.

A second shoulder belt 142 included in child-restraint harness 14 is arranged to extend through second belt-travel channel 342 as suggested in FIGS. 1A, 1C, and 1F. Second shoulder belt 142 is also arranged to extend through a second shoulder belt-receiving slot 182 formed in head cradle 80 of headrest 18 as suggested in FIG. 1A and through a second shoulder belt-receiving slot 92 formed in slidable cradle retainer 90 of headrest 18 as suggested in FIGS. 1C, 1D, and 1F.

Head cradle 80 of headrest 18 includes a harness-control unit 83 formed to include first and second belt-receiving slots 181, 182. Head cradle 80 also includes a first side wing 81 coupled to one side of harness-control unit 83 and a second side wing 82 coupled to another side of harness-control unit 83 as suggested in FIG. 2. Illustratively, a head of a child seated on juvenile seat 12 is positioned to lie between first and second side wings 81, 82 on harness-control unit 83.

Headrest 18 is mounted for up-and-down movement on upper beam stabilizer 34 and relative to seat back 22 of seat shell 20. The first and second shoulder belt-receiving slots 181, 182 of harness-control unit 83 of head cradle 80 and the first and second shoulder belt-receiving slots 91, 92 formed in slidable cradle retainer 90 are aligned with their companion belt-travel channels 341, 342 formed in upper beam stiffener 34 of rigidifying truss 30 as suggested in FIG. 3C. Shoulder belt-receiving slots 181, 182 formed in head cradle 80 and shoulder belt-receiving slots 91, 92 formed in slidable cradle-retainer plate 90 operate to keep the shoulder belts 141, 142 that are carried on headrest-retainer rod 73 as suggested in FIG. 1C positioned at an appropriate height that corresponds to the vertical position of headrest 18 relative to seat back 22.

Child-restraint harness 14 is used to restrain a child sitting on seat shell 20. Child-restraint harness 14 in an illustrative embodiment is configured to include shoulder belts 141, 142, a crotch belt 143, and thigh-restraint belts (not shown). Belt-travel channels 341, 342 formed in rigidifying truss 30 allow shoulder belts 141, 142 to move with headrest 18 along the length of seat back 22 between raised and lowered positions.

Headrest-height controller 19 is included in juvenile seat 12 and is shown diagrammatically in FIG. 1A. Headrest-height controller 19 is configured and arranged to vary the height of headrest 18 above seat bottom 21. An illustrative headrest-height controller 19 includes a headrest lock 70 and a headrest-lock release 71.

Headrest lock 70 comprises a movable headrest-retainer rod 73 arranged to extend under and support portions of shoulder belts 141, 142 and one or more rearwardly extending notched plates 74 coupled to upper panel 34U of upper beam stabilizer 34 as suggested in FIG. 1C. Each notched plate 74 is formed to include a series of companion rod-receiving notches 75 as suggested in FIG. 1C.

Headrest-lock release 71 comprises an actuator 77, an actuator support 79, and a return spring 77S as suggested in FIGS. 3A and 3B. Actuator 77 includes a movable PUSH handle 78 and a release lever 76 interconnecting PUSH handle 78 and headrest-retainer rod 73 for selectively moving headrest-retainer rod 73 away from upper beam stabilizer 34 of rigidifying truss 30 (at the option of a caregiver) to disengage rod-receiving notches 75 to free headrest 18 to be moved up or down on upper beam stabilizer 34 and relative to seat back 22 between raised and lowered positions in response to movement of PUSH handle 78 relative to seat back 20 of seat shell 20 by a caregiver. Whenever headrest-retainer rod 73 is deposited by headrest-lock release 71 into rod-receiving notches 75 formed in notched plates 74, headrest 18 is retained in a selected stationary position above seat bottom 21 of seat shell 20 and the shoulder belts 141, 142 carried on headrest-retainer rod 73 are raised or lowered relative to seat back 22 along with the rest of headrest 18.

Release lever 76 is mounted for pivotable movement on actuator support 79 relative to head cradle 80 about a horizontal pivot axis 71A in response to application of a pivot-inducing force to release lever 76 by a caregiver to move headrest-retainer rod 73 in a direction away from the rear portion of upper beam stabilizer 34 and relative to rod receiver 72 from the locked position to the unlocked position. Release lever 76 includes a pivot mount 761, a handle support 762, and a rod mover 763 as shown, for example, in FIGS. 3A and 3B. Handle support 762 is coupled to PUSH handle 78 and pivot mount 761. Rod mover 763 is coupled to handle support 762 and headrest-retainer rod 73.

Pivot mount 761 includes pivot posts 761L, 761R intersecting horizontal pivot axis 71A and extending into companion post receivers 79L, 79R formed in actuator support 79 for rotative bearing engagement therein and pivotable movement about horizontal pivot axis 71A. Handle support 762 is arranged to interconnect PUSH handle 78 and rod mover 763. Handle support 762 is coupled to pivot posts 761L, 761R for teeter-totter pivoting movement about pivot axis 71A. An upper portion of handle support 762 extends upwardly from pivot posts 761L, 761R to handle 78 while a lower portion of handle support 762 extends downwardly from pivot posts 761L, 761R to rod mover 763 as shown, for example, in FIG. 3B.

PUSH handle 78 is arranged to move relative to the head cradle 80 during pivoting movement of release lever 76 about horizontal pivot axis 71A and configured to be gripped by a caregiver pivoting release lever 76 about horizontal pivot axis 71A. Return spring 77S is coupled at a first end thereof to outer plate 801 of head cradle 80 and at an opposite second end thereof to PUSH handle 78. Return spring 77S is configured to provide means for yieldably urging headrest-retainer rod 73 in a direction toward the rear portion of upper beam stabilizer 34 and into a rod-receiving notch 75 formed in a notched plate 74 upon arrival of headrest-retainer rod 73 in a position confronting the rod-receiving notch once a caregiver lets go of release lever 76 to allow pivoting movement of release lever 76 about horizontal pivot axis 71A so as to retain headrest 18 in a selected one of the fixed positions on upper beam stabilizer 34 of rigidifying truss 30. Return spring 77S is arranged to lie in a space provided between outer plate 801 of head cradle 80 and handle 78.

Head cradle 80 is hollow and formed to include an interior region 803. Handle support 762 and most of rod mover 763 is arranged to lie in interior region 803 as suggested in FIG. 4. Handle 78 is arranged to lie outside of interior region 803 as also suggested in FIG. 4.

Head cradle 80 is formed to include a rearward-facing aperture 804 opening into interior region 803 as suggested in FIGS. 4 and 6. Handle 78 includes a finger-grip portion exposed in rearward-facing aperture 804 to be gripped by a caregiver and arranged to be moved toward outer plate 801 by a caregiver to cause release lever 76 to pivot about horizontal pivot axis 71A to compress return spring 77S and move headrest-retainer rod 73 from the locked position to the unlocked position as suggested in FIG. 5.

Reference is hereby made to U.S. application Ser. No. 12/726,128, filed on Mar. 17, 2010, which reference is hereby incorporated in its entirety therein, for disclosures relating to headrest-height controllers. In an illustrative process, a caregiver can operate headrest-height controller 19 to unlock and lock headrest 18 so as to change the height of headrest 18 above seat bottom 21. A caregiver can squeeze or otherwise move PUSH handle 78 toward seat shell 20 to cause release lever 76 to move headrest-retainer rod 73 relative to notched plates 74 and cradle retainer 90 to disengage notches 75 formed in notched plates 74. Then the caregiver can lift headrest 18 to a higher position on upper beam stabilizer 34 and relative to seat back 22 or drop headrest 18 to a lower position on upper beam stabilizer 34 and relative to seat back 22 and then release PUSH handle 78 to allow release lever 76 to move (under, e.g., a spring force provided by return spring 77S) to place headrest-retainer rod 73 in another of the notches 75 corresponding to a selected height above seat bottom 21.

Slidable cradle retainer 90 of headrest 18 is configured and arranged to assist in transferring loads applied to child-restraint harness 14 by a child 100 seated in juvenile seat 12 to first and second stiffener beams 31, 32 of rigidifying truss 30 of juvenile seat 12 during exposure of a vehicle 101 having a passenger seat 102 carrying juvenile seat 12 to an external impact force 103. During such an event, relative movement of the seated harnessed child 100 and juvenile seat 12 causes, in series (1) a load to be applied by child 100 to first and second shoulder belts 141, 142; (2) a load to be applied by belts 141, 142 to slidable cradle retainer 90 of headrest 18; and (3) a load to be applied by load-transfer flanges 901-904 of slidable cradle retainer 90 to load-receiver rails 301-304 of upper beam stabilizer 34 of rigidifying truss 30. As such, rigidifying truss 30 (e.g., first and second stiffener beams 31, 32, lower beam stabilizer 33, and upper beam stabilizer 34) carry loads applied to juvenile seat 12 during exposure of juvenile seat 12 to an external impact force sufficient to cause movement of a seated and restrained child relative to juvenile seat 12.

As shown in FIG. 2, slidable cradle retainer 90 of headrest 18 includes a central bed 900 formed to include first and second belt-receiving slots 91, 92 and load-transfer flanges 901-904. Central bed 900 includes a first glide block 911, a second glide block 912 arranged to lie in spaced-apart relation to first glide block 911, and a web 913 arranged to lie between and interconnect glide blocks 911, 912 as shown, for example, in FIG. 3C. First glide block 911 is formed to include first shoulder belt-receiving slot 91 and second glide block 912 is formed to include second shoulder belt-receiving slot 92 as suggested in FIG. 3C.

Web 913 is formed to include a lever-receiving aperture 914 as shown, for example, in FIGS. 1C, 3A, 3C, and 4-7. Release lever 76 is arranged to extend through and move in lever-receiving aperture 914 as suggested in FIGS. 4-7 to move headrest-retainer rod 73 relative to notched plates 74 in rod receiver 72.

When cradle retainer 90 is mounted for sliding movement on upper beam stabilizer 34, first glide block 911 is arranged to extend into first belt-travel channel 341 formed in upper beam stabilizer 34 and second glide block 912 is arranged to extend into second belt-travel channel 342 formed in upper beam stabilizer 34 as suggested in FIGS. 1F and 3C. Glide block 911 is moved in first belt-travel channel 341 to move first shoulder belt 141 in first belt-travel channel 341 and glide block 912 is moved in second belt-travel channel 342 to move second shoulder belt 142 in second belt-travel channel 342 during sliding movement of cradle retainer 90 on upper beam stabilizer 34. As suggested in FIG. 3C, first glide block 911 lies between first outer and inner load-transfer flanges 901, 902 and second glide block 912 lies between second inner and outer load-transfer flanges 903, 904.

Figure 8:
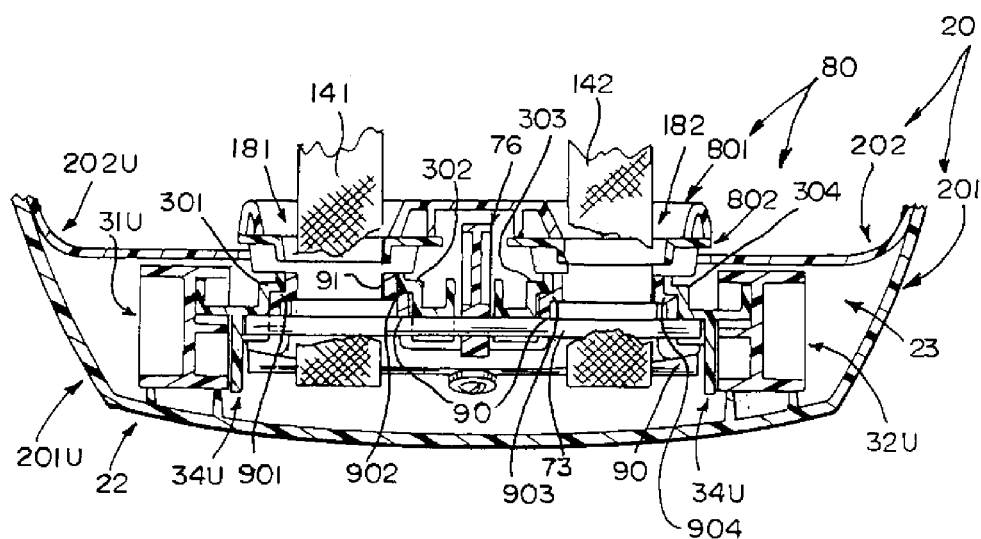
FIG. 8 is a sectional view taken along line 8-8 of FIG. 4 showing the headrest-retainer rod in the normally engaged position.
Figure 9:
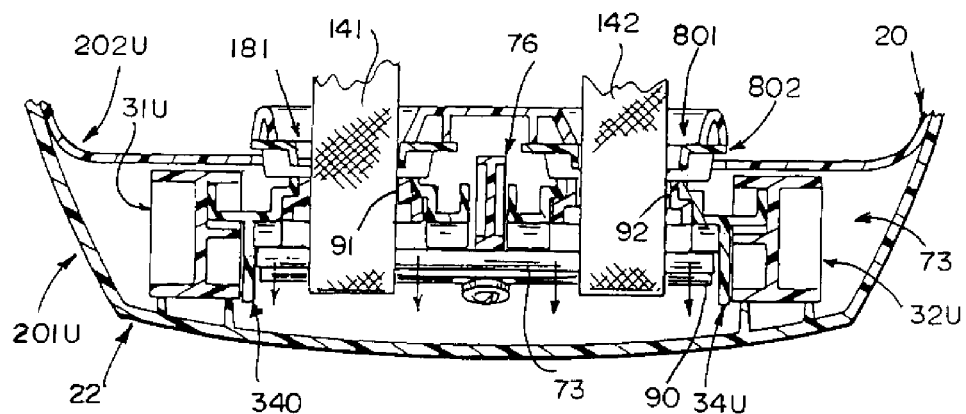
FIG. 9 is a sectional view taken along line 9-9 of FIG. 5 showing the headrest-retainer rod in the disengaged position.

A reinforcing bar 905 is coupled to central bed 900 of cradle retainer 90 to move therewith as shown, for example, in FIGS. 7 and 8. In illustrative embodiments, reinforcing bar 902 is coupled to a rearwardly facing portion of web 913 as shown, for example, in FIG. 1F. Reinforcing bar 905 is arranged to lie in spaced-apart parallel relation to headrest-retainer rod 73 as suggested in FIG. 8. Reinforcing bar 905 is held in a fixed position on central bed 900 by a fastener 906 coupled to central bed 900 and to reinforcing bar 905 as suggested in FIGS. 1F and 4.

The invention claimed is:

1. A child restraint comprising
a juvenile seat including a hollow seat shell having a seat bottom and a seat back extending upwardly from the seat bottom and cooperating with the seat bottom to define an enclosed interior region of the hollow seat shell and a rigidifying truss located in the enclosed interior region of the hollow seat shell and coupled to the hollow seat shell to lie in a stationary position in the interior region,
a headrest mounted for up-and-down movement on the rigidifying truss relative to the seat back,
a headrest-height controller arranged to adjust the height of the headrest on the rigidifying truss relative to the seat bottom, wherein the headrest-height controller includes a headrest lock and a headrest-lock release, the headrest lock includes a rod receiver coupled to the rigidifying truss and located in the interior region of the hollow seat shell and a headrest-retainer rod arranged to lie and move in the interior region relative to the rod receiver between a locked position engaging the rod receiver to retain the headrest in a selected position on the rigidifying truss to establish the elevation of the headrest above the seat bottom and an unlocked position disengaging the rod receiver to free the headrest for up-and-down movement relative to the rigidifying truss and the seat back to establish a new elevation of the headrest above the seat bottom, the headrest-lock release is coupled to the headrest to move therewith relative to the rigidifying truss and seat back and mounted for movement on the headrest by a caregiver, the headrest-retainer rod is coupled to the headrest-lock release to move therewith between the locked and unlocked positions in response to movement of the headrest-lock release relative to the headrest by a caregiver, and wherein the rigidifying truss includes a first load-receiver rail, the headrest includes a first load-transfer flange maintained in mating engagement with the first load-receiver rail of the rigidifying truss during up-and-down movement of the headrest on the rigidifying truss.

2. The child restraint of claim 1, wherein the rigidifying truss includes a first load-receiver rail, the headrest includes a first load-transfer flange maintained in mating engagement with the first load-receiver rail of the rigidifying truss during up-and-down movement of the headrest on the rigidifying truss.

3. The child restraint of claim 2, further comprising a child-restraint harness coupled to the juvenile seat and configured to restrain a child seated on the seat bottom, the child-restraint harness includes first and second shoulder belts arranged to pass through apertures formed in the headrest to move up and down therewith relative to the seat bottom, the headrest includes a head cradle located on a front side of the seat back above the seat bottom and a slidable cradle retainer located on an opposite back side of the seat back and coupled to the head cradle to move therewith during up-and-down movement of the headrest on the rigidifying truss relative to the seat back, the slidable cradle retainer is formed to include the first load-transfer flange and is coupled to the first and second shoulder belts, and the slidable cradle retainer is configured to provide means for transferring loads applied by the first and second shoulder belts to the slidable cradle retainer in response to movement of the seated child relative to the juvenile seat to tension the first and second shoulder belts during exposure of a vehicle carrying the juvenile seat to an external impact to the rigidifying truss via a load-transfer path established by mating engagement of the first load-transfer flange on the head cradle and the first load-receiver rail on the rigidifying truss.

4. The child restraint of claim 3, wherein the rigidifying truss is formed to include upwardly extending and laterally spaced-apart first and second belt-travel channels, the first shoulder belt is arranged to pass through the first belt-travel channel and the second shoulder belt is arranged to pass through the second belt-travel channel during up-and-down movement of the headrest on the rigidifying truss, and the first load-receiver rail is arranged to extend along an edge of the first belt-travel channel.

5. The child restraint of claim 4, wherein the rigidifying truss includes a first stiffener beam, a second stiffener beam arranged to lie in laterally spaced-apart relation to the first stiffener beam, and an upper beam stabilizer located in a back cavity of the interior region formed in the seat back and arranged to interconnect the first and second stiffener beams to retain the first and second stiffener beams in fixed relation to one another, the rod receiver is coupled to the upper beam stabilizer, and the upper beam stabilizer is formed to include the first and second belt-travel channels, and the upper beam stabilizer includes the first load-receiver rail.

6. The child restraint of claim 4, wherein the rigidifying truss further includes second, third, and fourth load-receiver rails, the first load-receiver rail is arranged to extend along a left edge of the first belt-travel channel, the second load-receiver rail is arranged to extend along an opposite right edge of the first belt-travel channel to lie in spaced-apart relation to the first load-receiver rail and locate a portion of the first shoulder belt therebetween, the third load-receiver rail is arranged to extend along a left edge of the second belt-travel channel, the fourth load-receiver rail is arranged to extend along an opposite right edge of the second belt-travel channel to lie in spaced-apart relation to the third load-receiver rail to locate a portion of the second shoulder belt therebetween, the slidable cradle retainer further includes second, third, and fourth load-transfer flanges, the second load-transfer flange is maintained in mating engagement with the second load-receiver rail during up-and-down movement of the headrest on the rigidifying truss, the third load-transfer flange is maintained in mating engagement with the third load-receiver rail during up-and-down movement of the headrest on the rigidifying truss, and the fourth load-transfer flange is maintained in mating engagement with the fourth load-transfer flange during up-and-down movement of the headrest on the rigidifying truss.

7. The child restraint of claim 3, wherein the cradle retainer is formed to include first and second belt-receiving slots, the head cradle is formed to include a first belt-receiving slot aligned with the first belt-receiving slot of the cradle retainer and a second belt-receiving slot aligned with the second belt-receiving slot of the cradle retainer, the first shoulder belt is arranged to pass through the first belt-receiving slots formed in the head cradle and the cradle retainer, and the second shoulder belt is arranged to pass through the second belt-receiving slots formed in the head cradle and the cradle retainer.

8. The child restraint of claim 7, wherein the rigidifying truss is formed to include upwardly extending and laterally spaced-apart first and second belt-travel channels, the first shoulder belt is arranged to, in series, exit the first belt-receiving slot formed in the cradle retainer, pass through the first belt-travel channel formed in the rigidifying truss, and then enter the first belt-receiving slot formed in the head cradle, and the second shoulder belt is arranged to, in series, exit the second belt-receiving slot formed in the cradle retainer, pass through the second belt-travel channel formed in the rigidifying truss, and then enter the second belt-receiving slot formed in the head cradle.

9. The child restraint of claim 7, wherein the rigidifying truss further includes a second load-receiver rail arranged to lie in spaced-apart relation to the first load-receiver rail to locate the first and second belt-receiving slots formed in the cradle retainer therebetween and the cradle retainer further includes a second load-transfer flange arranged to lie in spaced-apart relation to the first load-transfer flange and remain in mating engagement with the second load-receiver rail of the rigidifying truss during up-and-down movement of the headrest on the rigidifying truss.

10. The child restraint of claim 3, wherein the rigidifying truss is formed to include upwardly extending and laterally spaced-apart first and second belt-travel channels, the cradle retainer includes a first glide block arranged to extend into and move in the first belt-travel channel during up-and-down movement of the headrest relative to the rigidifying truss and formed to include a first belt-receiving slot and a second glide block arranged to extend into and move in the second belt-travel channel during up-and-down movement of the headrest relative to the rigidifying truss, the first shoulder belt is arranged to pass through each of the first belt-receiving slot and first belt-travel channel, and the second shoulder belt is arranged to pass through each of the second belt-receiving slot and the second belt-travel channel.

11. The child restraint of claim 10, wherein the first load-receiver rail is arranged to extend along an edge of the first belt-travel channel and the first load-transfer flange is arranged to extend along an edge of the first glide block.

12. The child restraint of claim 10, wherein the cradle retainer further includes a web arranged to lie between and interconnect first and second glide blocks, the web is formed to include a lever-receiving aperture, and the headrest-lock release is coupled to the head cradle to move therewith and is configured to include a release lever arranged to extend through the lever-receiving aperture formed in the web and coupled to the headrest-retainer rod, and the release lever is supported for pivotable movement about a pivot axis and in the lever-receiving aperture to move the headrest-retainer rod relative to the rod receiver.

13. The child restraint of claim 1, wherein the rigidifying truss includes a first stiffener beam, a second stiffener beam arranged to lie in laterally spaced-apart relation to the first stiffener beam, and an upper beam stabilizer located in a back cavity of the interior region formed in the seat back and arranged to interconnect the first and second stiffener beams to retain the first and second stiffener beams in fixed relation to one another and wherein the rod receiver is coupled to the upper beam stabilizer.

14. The child restraint of claim 13, wherein the rod receiver includes a notched plate coupled to the upper beam stabilizer and formed to include a series of rod-receiving notches having openings facing away from a head cradle included in the headrest and arranged to lie on a front side of the seat back above the seat bottom, each rod-receiving notch is located at a different elevation above the seat bottom, and the headrest retainer rod is arranged to move relative to the rod receiver and the upper beam stabilizer and the hollow seat shell in the interior region of the hollow seat shell to engage a selected first of the rod-receiving notches in the locked position to establish a first elevation of the headrest above the seat bottom and to engage a selected second of the rod-receiving notches in the locked position to establish a different second elevation of the headrest above the seat bottom and to disengage the rod-receiving notches formed in the notched plate in the unlocked position.

15. The child restraint of claim 14, wherein the hollow seat shell includes a back frame arranged to lie in spaced-apart relation to the upper beam stabilizer, the notched plate is arranged to lie in a stationary position in the interior region of the hollow seat shell between the upper beam stabilizer and the back frame, and the headrest-retainer rod is coupled to the headrest-lock release to move relative to the notched plate in a space provided in the back cavity of the interior region of the hollow seat shell between the upper beam stabilizer and the back frame of the hollow seat shell.

16. The child restraint of claim 15, wherein the hollow seat shell further includes a backrest arranged to lie in spaced-apart relation to the back frame to locate the upper beam stabilizer therebetween, the headrest including a head cradle arranged to lie above the seat bottom and in spaced-apart relation to the upper beam stabilizer to locate the backrest of the hollow seat shell therebetween and a cradle retainer coupled to the head cradle and mounted on the upper beam stabilizer to lie between the upper beam stabilizer and the back frame and move up and down relative to the seat bottom to change the elevation of the head cradle relative to the seat bottom, and the headrest-lock release is coupled to the head cradle to move therewith.

17. The child-restraint of claim 15, wherein the hollow seat shell includes a bottom shell portion and a top shell portion coupled to the bottom shell portion to define therebetween the interior region of the hollow seat shell, the top shell portion includes a backrest arranged to lie in spaced-apart relation to the back frame to locate the upper beam stabilizer therebetween, the first and second stiffener beams include upper portions located in the back cavity and coupled to the upper beam stabilizer and lower portions located in a bottom cavity of the interior region formed in the seat bottom, and the bottom shell portion includes the back frame and a bottom frame included in the seat bottom and coupled to the lower portions of the first and second stiffener beams to rigidify the seat bottom of the hollow seat shell.

18. The child restraint of claim 14, wherein the upper beam stabilizer is formed to include a pair of upwardly extending laterally spaced-apart first and second belt-travel channels and further comprising a child-restraint harness including a first shoulder belt engaging the headrest-retainer rod and extending from the headrest-retainer rod in sequence through the first belt-travel channel formed in the upper beam stabilizer and a first shoulder belt-receiving slot formed in a head cradle included in the headrest and arranged to lie in spaced-apart relation to the notched plate to locate the upper beam stabilizer therebetween and a second shoulder belt engaging the headrest-retainer rod and extending from the headrest-retainer rod in sequence through the second belt-travel channel formed in the upper beam stabilizer and a second shoulder belt-receiving slot formed in the head cradle.

19. The child restraint of claim 18, wherein the notched plate is arranged to lie between the first and second belt-travel channels formed in the upper beam stabilizer.

20. The child restraint of claim 18, wherein the hollow seat shell includes a bottom shell portion and a top shell portion coupled to the bottom shell portion to define therebetween the interior region of the hollow seat shell, the bottom shell portion includes a back frame arranged to lie in spaced-apart relation to the upper beam stabilizer to locate the notched plate and the headrest-retainer rod therebetween, the top shell portion includes a backrest arranged to lie in spaced-apart relation to the back frame to locate the upper beam stabilizer therebetween and to lie between the head cradle and the upper beam stabilizer and the first and second shoulder belts pass through an opening formed in the backrest of the top shell portion of the hollow seat shell.

21. The child restraint of claim 13, wherein the hollow seat shell includes a bottom shell portion and a top shell portion coupled to the bottom shell portion to form the bottom and back cavities of the interior region therebetween, the bottom shell portion includes a bottom frame coupled to the lower portions of the first and second stiffener beams to rigidify the seat bottom of the hollow seat shell and a back frame coupled to the upper portions of the first and second stiffener beams to rigidify the seat back of the hollow seat shell, and the top shell portion includes a seat pad arranged to lie in spaced-apart relation to the bottom frame to locate the lower portions of the first and second stiffener beams therebetween and a backrest arranged to lie in spaced-apart relation to the back frame to locate the upper portions of the first and second stiffener beams therebetween and coupled to the upper portions of the first and second stiffener beams to rigidify the seat back of the hollow seat shell, and wherein the upper beam stabilizer is arranged to lie between the backrest of the top shell portion and the back frame of the bottom shell portion and the rod receiver is arranged to lie between the upper beam stabilizer and the back frame of the bottom shell portion.

22. The child restraint of claim 21, wherein the upper beam stabilizer includes an upper panel arranged to extend between the first and second stiffener beams to lie in a stationary position in the back cavity between the backrest and the back frame, the upper panel is formed to include a pair of upwardly extending and laterally spaced-apart belt-travel channels and each of the belt-travel channels is configured to provide means for receiving therein a shoulder belt included in a child-restraint harness coupled to the juvenile seat, and the rod receiver is coupled to the upper panel of the upper beam stabilizer.

23. The child restraint of claim 22, wherein the rod receiver includes a notched plate coupled to a rear portion of the upper panel and located between the belt-travel channels and formed to include a series of rod-receiving notches having openings facing away from the headrest and sized to receive the headrest-retainer rod therein.

24. A child restraint comprising
a juvenile seat including a hollow seat shell having a seat bottom and a seat back extending upwardly from the seat bottom and cooperating with the seat bottom to define an enclosed interior region of the hollow seat shell and a rigidifying truss located in the enclosed interior region of the hollow seat shell and coupled to the hollow seat shell to lie in a stationary position in the interior region,
a child-restraint harness coupled to the juvenile seat and configured to restrain a child seated on the seat bottom, and
a headrest coupled to the child-restraint harness and mounted for up-and-down movement on the rigidifying truss relative to the seat back, and wherein a first load-transfer flange included in the headrest is arranged to engage and slide on a first load-receiver rail included in the rigidifying truss during up-and-down movement of the headrest on the rigidifying truss and the headrest is configured to provide means for engaging the child-restraint harness to receive a load applied to the child-restraint harness by a seated child seated and restrained on the seat bottom of the juvenile seat during movement of the seated child relative to the juvenile seat in response to a sudden stop of a moving vehicle carrying the juvenile seat and for transferring the load from the headrest to the rigidifying truss located in the interior region of the hollow seat shell via a load-transfer path established by mating engagement of the first load-transfer flange included in the headrest and the first load-receiver rail included in the rigidifying truss.

25. The child restraint of claim 24, wherein the child-restraint harness includes first and second shoulder belts arranged to pass through apertures formed in the headrest to move up and down therewith relative to the seat bottom, the headrest includes a head cradle located on a front side of the seat back above the seat bottom and a slidable cradle retainer located on an opposite back side of the seat back and coupled to the head cradle to move therewith during up-and-down movement of the headrest on the rigidifying truss relative to the seat back, the slidable cradle retainer is formed to include the first load-transfer flange and is coupled to the first and second shoulder belts, and the slidable cradle retainer is configured to provide means for transferring loads applied by the first and second shoulder belts to the slidable cradle retainer in response to movement of the seated child relative to the juvenile seat to tension the first and second shoulder belts during exposure of a vehicle carrying the juvenile seat to an external impact to the rigidifying truss via a load-transfer path established by mating engagement of the first load-transfer flange on the head cradle and the first load-receiver rail on the rigidifying truss.

26. The child restraint of claim 25, wherein the rigidifying truss is formed to include upwardly extending and laterally spaced-apart first and second belt-travel channels, the cradle retainer includes a first glide block arranged to extend into and move in the first belt-travel channel during up-and-down movement of the headrest relative to the rigidifying truss and formed to include a first belt-receiving slot and a second glide block arranged to extend into and move in the second belt-travel channel during up-and-down movement of the headrest relative to the rigidifying truss, the first shoulder belt is arranged to pass through each of the first belt-receiving slot and first belt-travel channel, and the second shoulder belt is arranged to pass through each of the second belt-receiving slot and the second belt-travel channel.

27. The child restraint of claim 26, wherein the first load-receiver rail is arranged to extend along an edge of the first belt-travel channel and the first load-transfer flange is arranged to extend along an edge of the first glide block.

28. The child restraint of claim 24, wherein the cradle retainer is formed to include first and second belt-receiving slots, the head cradle is formed to include a first belt-receiving slot aligned with the first belt-receiving slot of the cradle retainer and a second belt-receiving slot aligned with the second belt-receiving slot of the cradle retainer, the first shoulder belt is arranged to pass through the first belt-receiving slots formed in the head cradle and the cradle retainer, and the second shoulder belt is arranged to pass through the second belt-receiving slots formed in the head cradle and the cradle retainer.

29. The child restraint of claim 28, wherein the rigidifying truss is formed to include upwardly extending and laterally spaced-apart first and second belt-travel channels, the first shoulder belt is arranged to, in series, exit the first belt-receiving slot formed in the cradle retainer, pass through the first belt-travel channel formed in the rigidifying truss, and then enter the first belt-receiving slot formed in the head cradle, and the second shoulder belt is arranged to, in series, exit the second belt-receiving slot formed in the cradle retainer, pass through the second belt-travel channel formed in the rigidifying truss, and then enter the second belt-receiving slot formed in the head cradle.

30. The child restraint of claim 29, wherein the rigidifying truss further includes a second load-receiver rail arranged to lie in spaced-apart relation to the first load-receiver rail to locate the first and second belt-receiving slots formed in the cradle retainer therebetween and the head cradle further includes a second load-transfer flange arranged to lie in spaced-apart relation to the first load-transfer flange and remain in mating engagement with the second load-receiver rail of the rigidifying truss during up-and-down movement of the headrest on the rigidifying truss.

31. The child restraint of claim 24, wherein the rigidifying truss is formed to include upwardly extending and laterally spaced-apart first and second belt-travel channels, the first shoulder belt is arranged to pass through the first belt-travel channel and the second shoulder belt is arranged to pass through the second belt-travel channel during up-and-down movement of the headrest on the rigidifying truss, and the first load-receiver rail is arranged to extend along an edge of the first belt-travel channel.

32. The child restraint of claim 31, wherein the rigidifying truss includes a first stiffener beam, a second stiffener beam arranged to lie in laterally spaced-apart relation to the first stiffener beam, and an upper beam stabilizer located in a back cavity of the interior region formed in the seat back and arranged to interconnect the first and second stiffener beams to retain the first and second stiffener beams in fixed relation to one another, the rod receiver is coupled to the upper beam stabilizer, and the upper beam stabilizer is formed to include the first and second belt-travel channels, and the upper beam stabilizer includes the first load-receiver rail.

33. The child restraint of claim 31, wherein the rigidifying truss further includes second, third, and fourth load-receiver rails, the first load-receiver rail is arranged to extend along a left edge of the first belt-travel channel, the second load-receiver rail is arranged to extend along an opposite right edge of the first belt-travel channel to lie in spaced-apart relation to the first load-receiver rail and locate a portion of the first shoulder belt therebetween, the third load-receiver rail is arranged to extend along a left edge of the second belt-travel channel, the fourth load-receiver rail is arranged to extend along an opposite right edge of the second belt-travel channel to lie in spaced-apart relation to the third load-receiver rail to locate a portion of the second shoulder belt therebetween, the slidable cradle retainer further includes second, third, and fourth load-transfer flanges, the second load-transfer flange is maintained in mating engagement with the second load-receiver rail during up-and-down movement of the headrest on the rigidifying truss, the third load-transfer flange is maintained in mating engagement with the third load-receiver rail during up-and-down movement of the headrest on the rigidifying truss, and the fourth load-transfer flange is maintained in mating engagement with the fourth load-transfer flange during up-and-down movement of the headrest on the rigidifying truss.

34. A child restraint comprising
a juvenile seat including a hollow seat shell having a seat bottom and a seat back extending upwardly from the seat bottom and cooperating with the seat bottom to define an enclosed interior region of the hollow seat shell and a rigidifying truss located in the enclosed interior region of the hollow seat shell and coupled to the hollow seat shell to lie in a stationary position in the interior region,
a headrest mounted for up-and-down movement on the rigidifying truss relative to the seat back,
a headrest lock including a rod receiver and a headrest-retainer rod, wherein the rod receiver is coupled to the rigidifying truss and formed to include a series of rod-receiving notches, each rod-receiving notch is located at a different elevation above the seat bottom, the headrest-retainer rod is arranged to lie and move in the interior region of the hollow seat shell relative to the rod receiver between a locked position extending into one of the rod-receiving notches formed in the rod receiver to retain the headrest in a selected position of the rigidifying truss to establish the elevation of the headrest above the seat bottom and an unlocked position disengaging the rod-receiving notches formed in the rod receiver to free the headrest for up-and-down movement on the headrest by a caregiver, and wherein the rigidifying truss includes a first load-receiver rail, the headrest includes a first load-transfer flange maintained in mating engagement with the first load-receiver rail of the rigidifying truss during up-and-down movement of the headrest on the rigidifying truss.

\* \* \* \* \*